United States Patent
Terahata

(10) Patent No.: US 9,741,167 B1
(45) Date of Patent: Aug. 22, 2017

(54) METHOD AND SYSTEM FOR PROVIDING AN IMAGE OF A VIRTUAL SPACE TO A HEAD MOUNTED DISPLAY

(71) Applicant: COLOPL, Inc., Tokyo (JP)

(72) Inventor: Shuhei Terahata, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/426,955

(22) Filed: Feb. 7, 2017

(30) Foreign Application Priority Data

Feb. 8, 2016 (JP) .................................. 2016-21784

(51) Int. Cl.
```
G06F 3/01        (2006.01)
G06F 3/0481      (2013.01)
H04N 13/02       (2006.01)
H04N 13/04       (2006.01)
G06T 19/00       (2011.01)
G06T 15/20       (2011.01)
```

(52) U.S. Cl.
CPC ............ *G06T 19/003* (2013.01); *G06F 3/012* (2013.01); *G06T 15/20* (2013.01); *G06T 19/006* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 2013/0336631 A1 | 12/2013 | Kura | |
| 2017/0078651 A1* | 3/2017 | Russell | ................ H04N 13/044 |

FOREIGN PATENT DOCUMENTS

| | | |
|---|---|---|
| JP | 2012-186659 A | 9/2012 |
| JP | 5869712 B1 | 2/2016 |
| WO | 2012/043480 A1 | 4/2012 |

OTHER PUBLICATIONS

Kiyoyasu Ando, "Application of 3D virtual space to terrestrial television programs", Journal of the Institute of Image Information and Television Engineers, Japan, The Institute of Image Information and Television Engineers, Feb. 1, 2009, vol. 63, No. 2, pp. 161-165.
(Continued)

*Primary Examiner* — Yingchun He
(74) *Attorney, Agent, or Firm* — Hauptman Ham, LLP

(57) ABSTRACT

A method includes defining a virtual space including a display object and a three-dimensional object. The method includes defining a first pair of virtual cameras in the virtual space. The method includes defining a second pair of virtual cameras in the virtual space. The method includes generating a first right-eye image, and a first left-eye image. Both the first right-eye and left-eye images include a first part of the virtual space and the display object. The method further includes generating a second right-eye image and a second left-eye image. Both the second right-eye and left-eye images include a second part of the virtual space and the three-dimensional object. The method further includes superimposing the first and right-eye images to overlap the three-dimensional object with the display object. The method further includes superimposing the first and second left-eye images to overlap the three-dimensional object with the display object.

20 Claims, 17 Drawing Sheets

(56) References Cited

OTHER PUBLICATIONS

Ryo Harashima et al., "Virtual TV Using a Head-Mounted Display", Technical Report of the Institute of Image Information and Television Engineers, Japan, The Institute of Image Information and Television Engineers, Mar. 2, 2015, vol. 39, No. 10, pp. 29-32.
Decision to Grant a Patent in JP Application No. 2016-021784, mailed Jul. 25, 2016.
"Oculus best practice, [online], [retrieved on Dec. 10, 2015], Internet <URL: http://static.oculus.com/documentation/pdfs/ja-jp/intro-vr/latest/bp.pdf>".

* cited by examiner

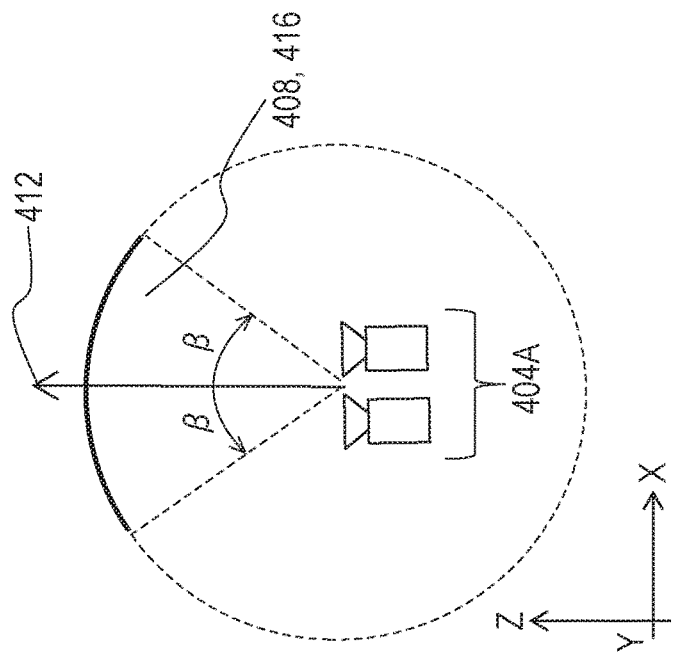
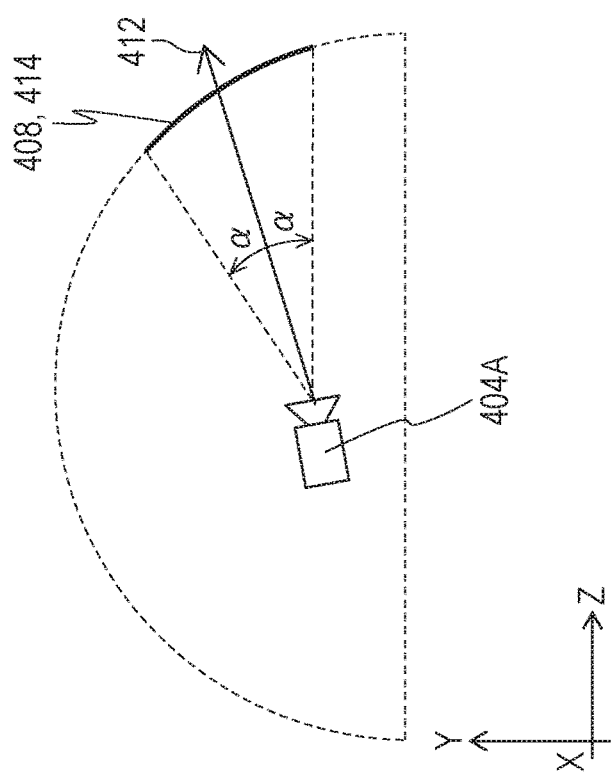

METHOD AND SYSTEM FOR PROVIDING AN IMAGE OF A VIRTUAL SPACE TO A HEAD MOUNTED DISPLAY

RELATED APPLICATIONS

The present application claims priority to Japanese Application Number 2016-21784, filed Feb. 8, 2016, the disclosure of which is hereby incorporated by reference herein in its entirety.

BACKGROUND

This disclosure relates to a method and system for providing an image of a virtual space, in which a user is immersed, to a head mounted display (HMD).

In recent years, there have been developed applications of, for example, games for providing a virtual reality (VR) space to a user with use of an HMD. In "'Oculus best practice', [online], [retrieved on Dec. 10, 2015], Internet <URL: http://static.oculus.com/documentation/pdfs/ja-jp/intro-vr/lat est/bp.pdf>", there is disclosed a technology of providing information to the user with use of a heads-up display (HUD) in a virtual space of such applications.

With use of the technology of "'Oculus best practice', [online], [retrieved on Dec. 10, 2015], Internet <URL: http://static.oculus.com/documentation/pdfs/ja-jp/intro-vr/lat est/bp.pdf>", the HUD is displayed in front of an object in the virtual space.

SUMMARY

This disclosure helps to effectively provide information that is desired to be shown to a user while maintaining a high-level user experience when an image of a virtual space, in which the user is immersed, is provided to an HMD.

In order to help maintain a sense of immersion, according to at least one embodiment of this disclosure, there is provided a method of providing an image of a virtual space, in which a user is immersed, to a head mounted display. The method includes taking images of apart of a virtual space including a display object positioned in the virtual space with use of a first right-eye virtual camera and a first left-eye virtual camera to generate a first right-eye image and a first left-eye image. The method further includes taking images of a part of a virtual space including a three-dimensional object positioned in the virtual space with use of a second right-eye virtual camera and a second left-eye virtual camera to generate a second right-eye image and a second left-eye image. The method further includes outputting, to a right-eye display unit of the head mounted display, the first right-eye image and the second right-eye image that are superimposed in such a manner that an image of the three-dimensional object overlaps with an image of the display object, and outputting, to a left-eye display unit of the head mounted display, the first left-eye image and the second left-eye image that are superimposed in such a manner that an image of the three-dimensional object overlaps with an image of the display object.

According to at least one embodiment of this disclosure, when the image of the virtual space, in which the user is immersed, is provided to the HMD, the information that is desired to be shown to the user can be effectively provided while maintaining the high-level user experience.

Other features and advantages of this disclosure are made clear based on description of some embodiments of this disclosure to be described later, and on illustration and description of the accompanying drawings and appended claims.

BRIEF DESCRIPTION OF THE DRAWINGS

FIG. 6A is a YZ plane diagram obtained by viewing a field of view region from an X direction.

FIG. 6B is an XZ plane diagram obtained by viewing the field of view region from a Y direction.

DETAILED DESCRIPTION

Figure 1:
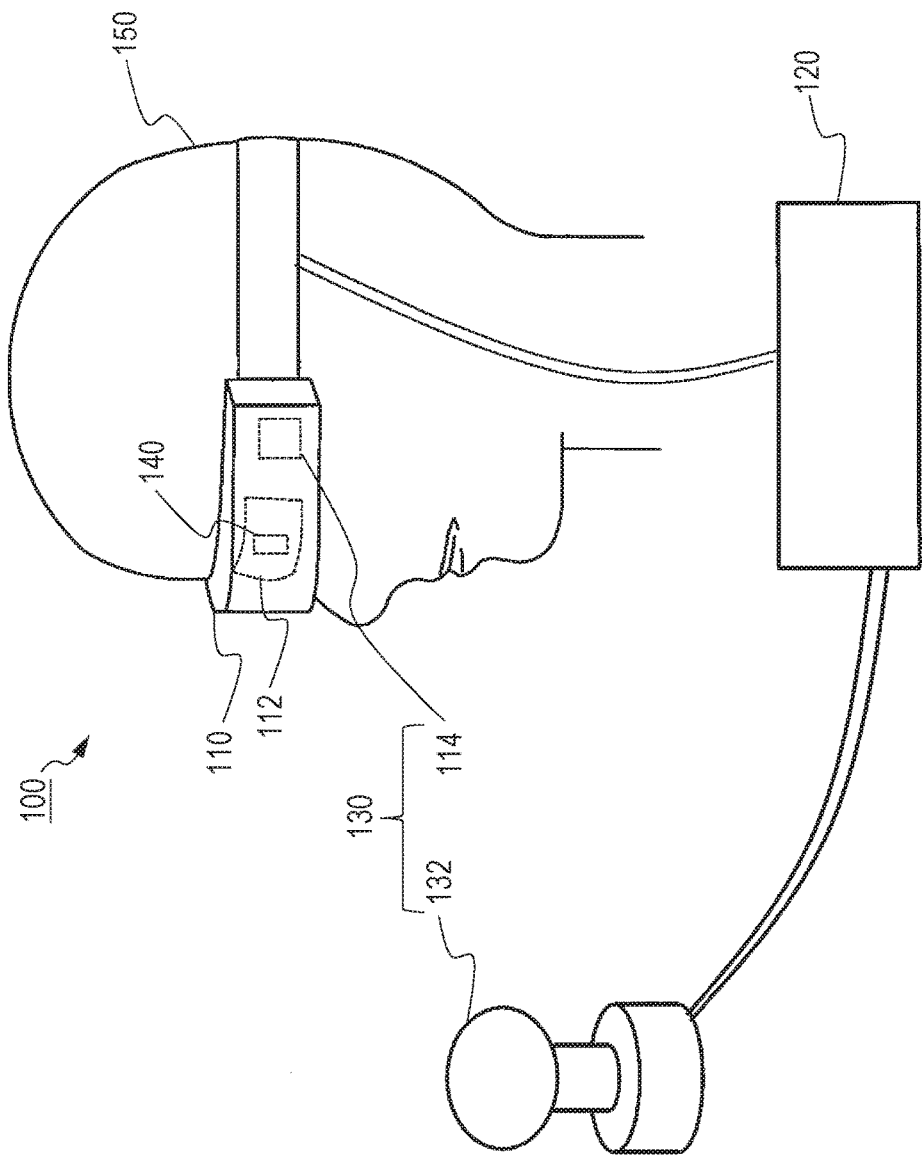
FIG. 1 is an illustration of an HMD system including an HMD, which may be used in at least one embodiment of this disclosure.

Contents of at least one embodiment of this disclosure are described below. A system according to at least one embodiment of this disclosure has the following configurations.

(Item 1)

A method of providing an image of a virtual space, in which a user is immersed, to a head mounted display. The method includes taking images of a part of a virtual space including a display object positioned in the virtual space with use of a first right-eye virtual camera and a first left-eye virtual camera to generate a first right-eye image and a first left-eye image. The method further includes taking images of a part of a virtual space including a three-dimensional object positioned in the virtual space with use of a second right-eye virtual camera and a second left-eye virtual camera to generate a second right-eye image and a second left-eye image. The method further includes outputting, to a right-eye display unit of the head mounted display, the first right-eye image and the second right-eye image that are superimposed in such a manner that an image of the three-dimensional object overlaps with an image of the display object, and outputting, to a left-eye display unit of the head mounted display, the first left-eye image and the second left-eye image that are superimposed in such a manner that an image of the three-dimensional object overlaps with an image of the display object.

According to the method of Item 1, when the image of the virtual space, in which the user is immersed, is provided to the HMD, the information that is desired to be shown to the user can be provided on the display object in the virtual space as a three-dimensional content. Therefore, the information that is desired to be shown to the user can be effectively provided while maintaining a high-level user experience.

(Item 2)

A method according to Item 1, in which a parallax between the second right-eye virtual camera and the second left-eye virtual camera with respect to the three-dimensional object is defined to be larger than a parallax between the first right-eye virtual camera and the first left-eye virtual camera with respect to the display object.

(Item 3)

A method according to Item 1 or 2, in which the first right-eye virtual camera and the first left-eye virtual camera are arranged in a first virtual space, and are configured to take images of a part of the first virtual space including the display object positioned in the first virtual space. Additionally, the method according to Item 1 or 2, in which the second right-eye virtual camera and the second left-eye virtual camera are arranged in a second virtual space that is different from the first virtual space, and are configured to take images of the three-dimensional object positioned in the second virtual space.

(Item 4)

A method according to Item 3, further including determining whether or not a predetermined condition is satisfied in the first virtual space. The method further includes, when it is determined that the predetermined condition is satisfied generating the second virtual space; and arranging, in the second virtual space, the second right-eye virtual camera, the second left-eye virtual camera, and the three-dimensional object that is stored in a storage unit in association with the display object.

(Item 5)

A method according to Item 4, in which the determining includes specifying a reference slight line of the user of the head mounted display. The determining further includes determining a field of view region in the first virtual space based on the reference slight line. The determining further includes determining whether or not the display object is included in the field of view region. The determining further includes determining that the predetermined condition is satisfied when the display object is included in the field of view region.

(Item 6)

A method according to Item 1 or 2, in which the first right-eye virtual camera, the first left-eye virtual camera, the second right-eye virtual camera, and the second left-eye virtual camera are arranged in the same virtual space. Additionally, the method according to Item 1 or 2, in which the first right-eye virtual camera and the first left-eye virtual camera are configured to take images of a part of the same virtual space including the display object positioned in the same virtual space. Further, the method according to Item 1 or 2, in which the second right-eye virtual camera and the second left-eye virtual camera are configured to take images of another part of the same virtual space including the three-dimensional object positioned in the same virtual space.

(Item 7)

A method according to any one of Items 1 to 6, in which inclinations of the first right-eye virtual camera and the first left-eye virtual camera and inclinations of the second right-eye virtual camera and the second left-eye virtual camera in the virtual space are changed depending on an inclination of the head mounted display.

(Item 8)

A method according to any one of Items 1 to 7, in which the three-dimensional object includes a three-dimensional content including at least one of a three-dimensional text, a three-dimensional image, or a three-dimensional moving image.

(Item 9)

A system for causing a computer to execute the method of any one of Items 1 to 8.

Exemplary embodiments of this disclosure are described in detail with reference to the drawings. This disclosure is not limited to these exemplary embodiments, and is defined by the appended claims and equivalents thereof. This disclosure includes all modifications within the appended claims and the equivalents thereof. In the following description, like elements are denoted by like reference symbols in the description of the drawings, and redundant description thereof is omitted.

FIG. 1 is an illustration of an HMD system 100 including an HMD 110, usable in at least one embodiment of this disclosure. The HMD system 100 includes the HMD 110 that is wearable on a head 150 of a user, a control circuit unit 120, and a movement sensor 130.

The HMD 110 includes a display 112 that is a non-transmissive display device (or a partially transmissive display device), a sensor unit 114, and an eye gaze sensor 140. The control circuit unit 120 is configured to display a right-eye image and a left-eye image on the display 112, to thereby provide a three-dimensional image using a parallax of both eyes as a virtual space. The display 112 is arranged right in front of the user's eyes, and thus the user is able to be immersed in the virtual space. As an example, with use of the HMD 110, the user is provided with a virtual game space in which the user can look around all of upward, downward, right, and left directions. In this case, the virtual space may include various objects, menu images, and the like that can be operated by the user in the game.

The display 112 includes a right-eye display unit configured to provide a right-eye image, and a left-eye display unit configured to provide a left-eye image. Further, as long as the right-eye image and the left-eye image can be provided, the display 112 may be constructed of one display device.

For example, a shutter configured to enable recognition of a display image with only one eye may be switched at high speed, to thereby independently provide the right-eye image and the left-eye image.

Figure 2:
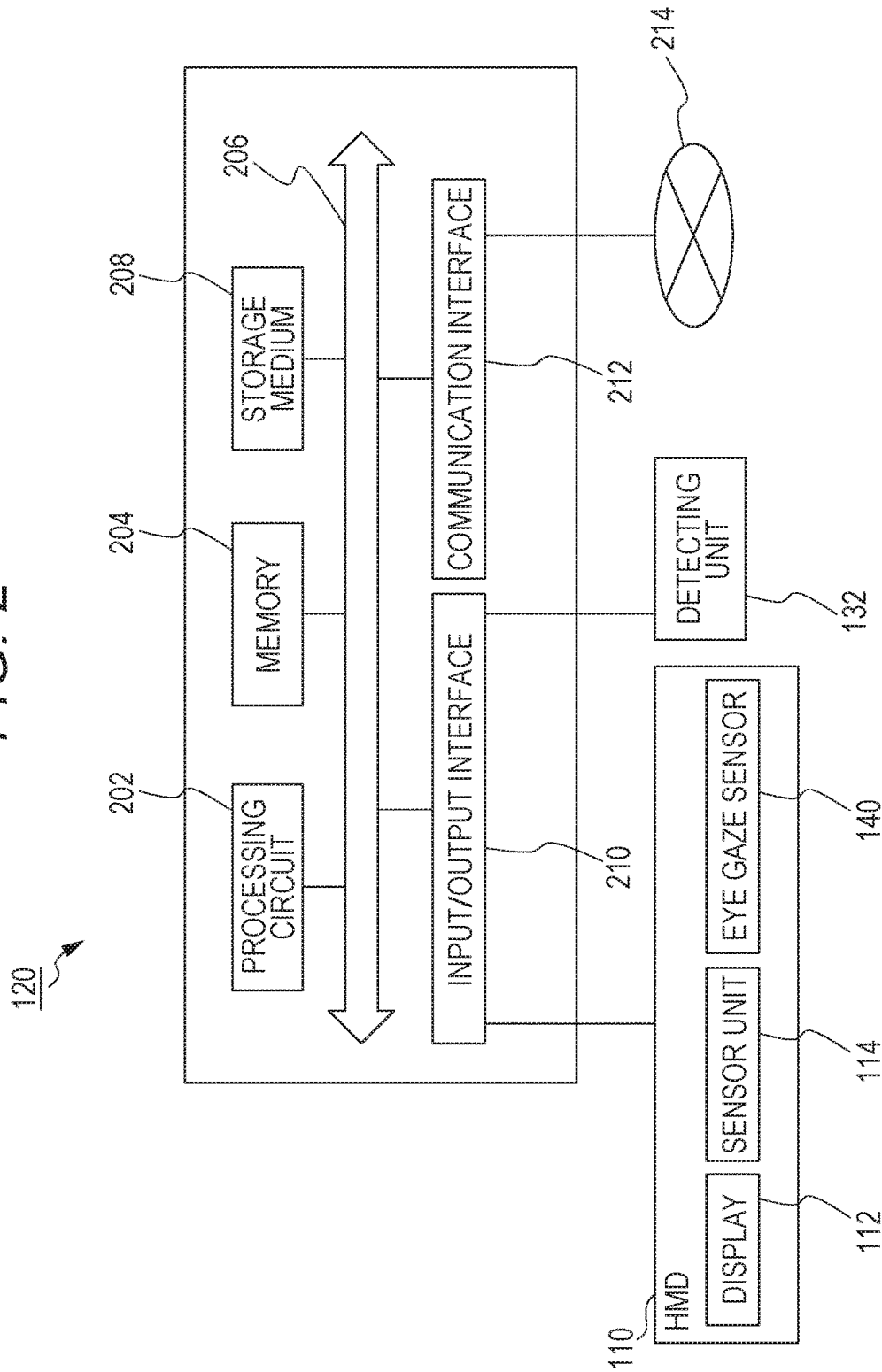
FIG. 2 is a block diagram of a basic configuration of a control circuit unit according to at least one embodiment.

The control circuit unit 120 is a computer to be connected to the HMD 110. FIG. 2 is a block diagram of a basic configuration of the control circuit unit 120. As illustrated in FIG. 2, the control circuit unit 120 includes a processing circuit 202, a memory 204, a storage medium 208, an input/output interface 210, and a communication interface 212, which are connected to each other via a communication bus 206 serving as a data transmission path. The processing circuit 202 includes various processing circuits such as a central processing unit (CPU), a micro-processing unit (MPU), and a graphics processing unit (GPU), and has a function of controlling the entire control circuit unit 120 and HMD system 100. The memory 204 includes, for example, a read only memory (ROM) and a random access memory (RAM), and is configured to temporarily (or permanently) store programs usable by the processing circuit 202 and control data such as calculation parameters. The storage medium 208 includes non-volatile storage devices such as a flash memory and a hard disk drive (HDD), and can store various kinds of data such as application programs for games and the like, various types of data relating to the programs, and user authentication programs. Further, a database including tables for managing data may be constructed in the storage medium 208. The input/output interface 210 includes various connection terminals such as a universal serial bus (USB) terminal, a digital visual interface (DVI) terminal, and a high-definition multimedia interface (HDMI) (trademark) terminal, and various processing circuits for wireless connection. The input/output interface 210 is configured to connect the HMD 110, various sensors including the movement sensor 130, the external controller, and the like to each other. The communication interface 212 includes various wire connection terminals for communicating to/from an external device via a network 214, and various processing circuits for wireless connection. The communication interface 212 is configured to adapt to various communication standards or protocols for communication via a local area network (LAN) or the Internet.

The control circuit unit 120 is configured to execute an application (for example, a game application) stored in the memory 204 or the storage medium 208, to thereby generate a virtual space in the application to present the virtual space on the display 112. Further, the memory 204 or the storage medium 208 stores a program for providing an image of the virtual space, in which the user is immersed, to the HMD according to the embodiment of this disclosure. Further, the memory 204 or the storage medium 208 may store a program for operating various objects to be displayed in the virtual space, or for displaying and controlling various menu images and the like. The control circuit unit 120 is not required to be mounted on the HMD 110, and may be constructed as separate hardware (for example, a known personal computer, or a server computer connected via a network). Further, only a part of the functions of the control circuit unit 120 may be mounted on the HMD 110, and the remaining functions thereof may be mounted on separate hardware.

The movement sensor 130 is configured to detect information relating to a position and an inclination of the HMD 110. The movement sensor 130 includes the sensor unit 114 and a detecting unit 132. The sensor unit 114 may include a plurality of light sources. The light source is, for example, an LED configured to emit an infrared ray. The detecting unit 132 is, for example, an infrared sensor, and is configured to detect the infrared ray from the light source as a detection point of the HMD 110, to thereby detect over time information relating to a position and an angle in a real space of the HMD 110 that are based on the movement of the user. Then, the time change of the position and the angle of the HMD 110 can be determined based on the temporal change of the information detected by the detecting unit 132, and thus information relating to the movement of the HMD 110 is detectable.

Figure 3:
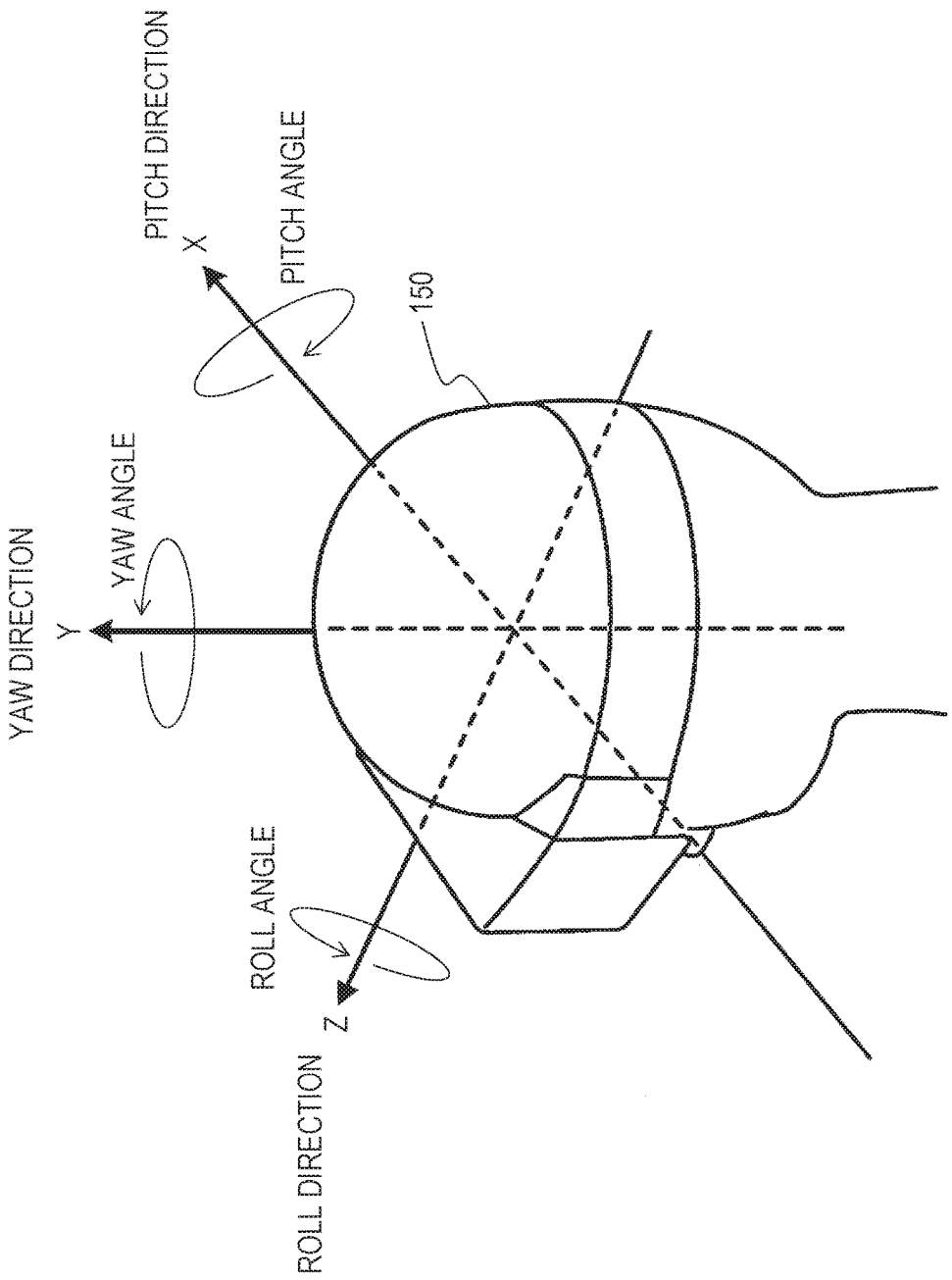
FIG. 3 is a diagram of a three-dimensional coordinate system about a head of a user wearing the HMD.

The information relating to the position and the inclination acquired by the movement sensor 130 is described with reference to FIG. 3. A three-dimensional coordinate system is defined about the head 150 of the user wearing the HMD 110. A perpendicular direction in which the user stands upright is defined as a yaw direction, a front-rear direction being orthogonal to the yaw direction and connecting between the user and the center of the display 112 is defined as a roll direction, and a lateral direction orthogonal to the yaw direction and the roll direction is defined as a pitch direction. With this, the temporal change in position of the user in the three-dimensional space is acquired. Further, a pitch angle being an inclination angle of the HMD 110 about a pitch-direction axis, a yaw angle being an inclination angle of the HMD 110 about a yaw-direction axis, and a roll angle being an inclination angle of the HMD 110 about a roll-direction axis are acquired.

The movement sensor 130 may be constructed of only one of the detecting unit 132 and the sensor unit 114 fixed near the display 112. The sensor unit 114 may be a geomagnetic sensor, an acceleration sensor, or a gyroscope, and is configured to use at least one of those sensors to detect the position and the inclination of the HMD 110 (in particular, the display 112) worn on the head 150 of the user. With this, the information relating to the movement of the HMD 110 is detectable. For example, the angular velocity sensor can detect over time the angular velocity about three axes of the HMD 110 based on the movement of the HMD 110, and can determine the time change of the angle about each axis. In this case, the detecting unit 132 may be omitted, in at least one embodiment. Further, the detecting unit 132 may include an optical camera. In this case, the information relating to the movement of the HMD 110 can be detected based on the image information, and thus the sensor unit 114 may be omitted, in at least one embodiment.

Figure 4:
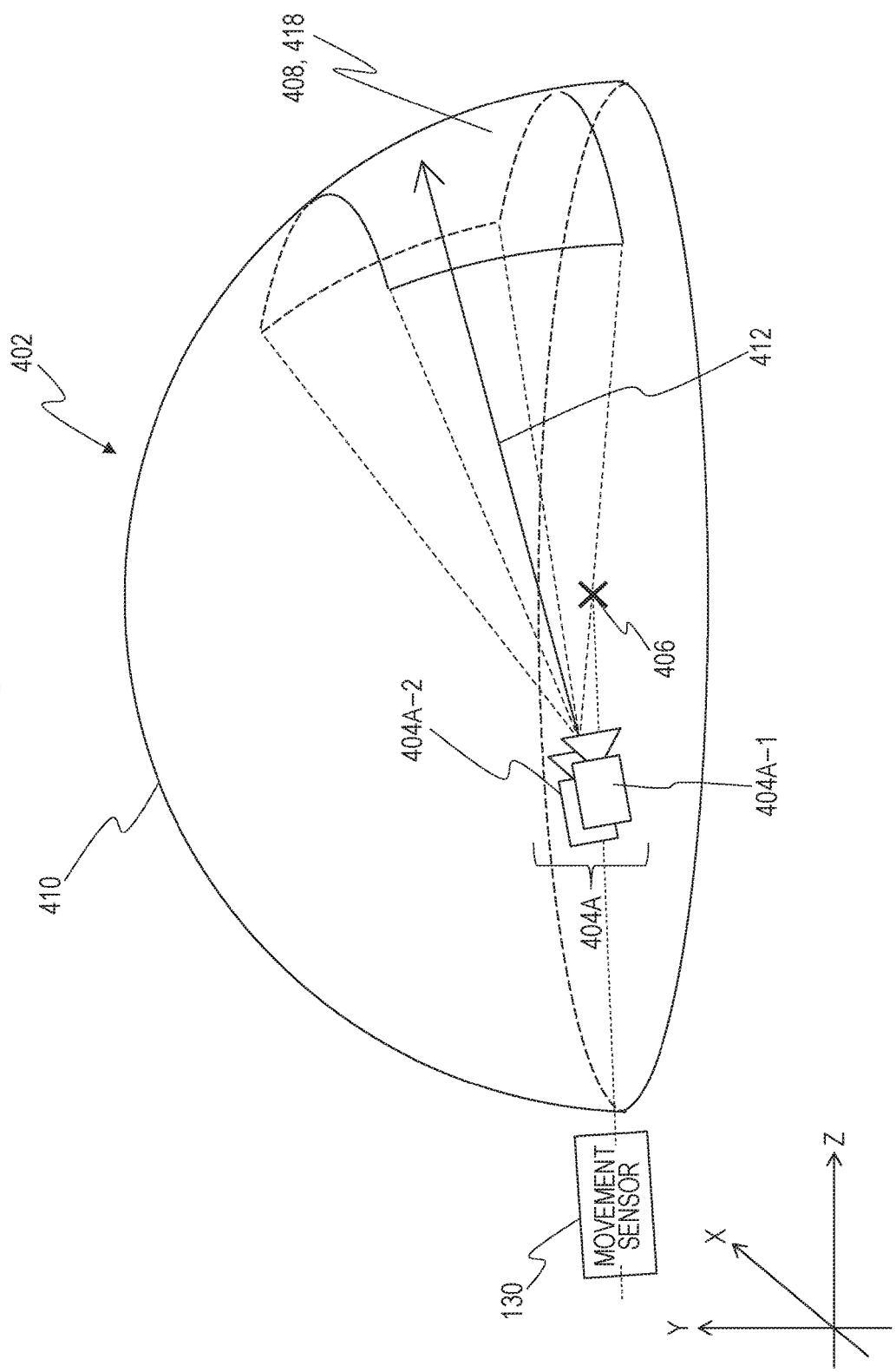
FIG. 4 is a diagram of a relationship between position tracking performed by a movement sensor and a virtual camera arranged in a virtual space.

FIG. 4 is an XYZ spatial diagram for illustrating an example of the virtual space. In FIG. 4, the XZ plane represents the ground surface, and the Y axis extends in a height direction. As illustrated in FIG. 4, a virtual space 402 is formed into a celestial sphere shape about a center 406. According to at least one embodiment of this disclosure, at least a first right-eye virtual camera 404A-1 and a first left-eye virtual camera 404A-2 (those virtual cameras are hereinafter collectively referred to as a "first virtual camera pair 404A" as necessary) are arranged in the virtual space 402. The first virtual camera pair 404A is configured to take an image in the virtual space 402. The movement of the first virtual camera pair 404A is associated with the movement of the movement sensor 130, and an image taken by the first virtual camera pair 404A is changed depending on the movement of the movement sensor 130. The first virtual camera pair 404A has a user's first-person perspective or a point of view associated with an avatar of the user.

The virtual space 402 may be formed into a celestial sphere shape having a plurality of substantially-square or substantially-rectangular mesh sections. In this case, each mesh section is associated with space information of the virtual space 402, and a field of view region 408 (field of view image 418) is defined based on this space information. In FIG. 4, the first virtual camera pair 404A is configured to take the field of view image 418 in the field of view region 408 based on a reference slight line 412.

Next, with reference to FIG. 4, description is given of a relationship between the movement sensor 130 and the first virtual camera pair 404A arranged in the virtual space 402. In order to describe the positional relationship between the first virtual camera pair 404A and the movement sensor 130, in the following, the position of the movement sensor 130 is set as the position of the detecting unit 132 when the detecting unit 132 is provided, and is set as the position of the sensor unit 114 when the detecting unit 132 is not provided. The first virtual camera pair 404A is arranged inside the virtual space 402, and the movement sensor 130 is virtually arranged outside of the virtual space 402 (in the real space).

In at least one embodiment, adjusting the center 406 of the celestial sphere to be arranged in the XZ plane and on a line connecting between the first virtual camera pair 404A and the sensor 130. For example, the first virtual camera pair 404A may be always arranged at the center 406. Further, when the user wearing the HMD 110 moves, and thus the position of the first virtual camera pair 404A moves in the X direction, the region of the virtual space 402 may be changed such that the center 406 is positioned on the line segment between the first virtual camera pair 404A and the movement sensor 130. In those cases, the position of the first virtual camera pair 404A in the virtual space 402 is fixed, and only the inclination thereof changes. Meanwhile, when the position of the first virtual camera pair 404A is moved in association with the movement of the movement sensor 130 in an arbitrary direction, the position of the first virtual camera pair 404A in the virtual space 402 is variable.

Figure 5:
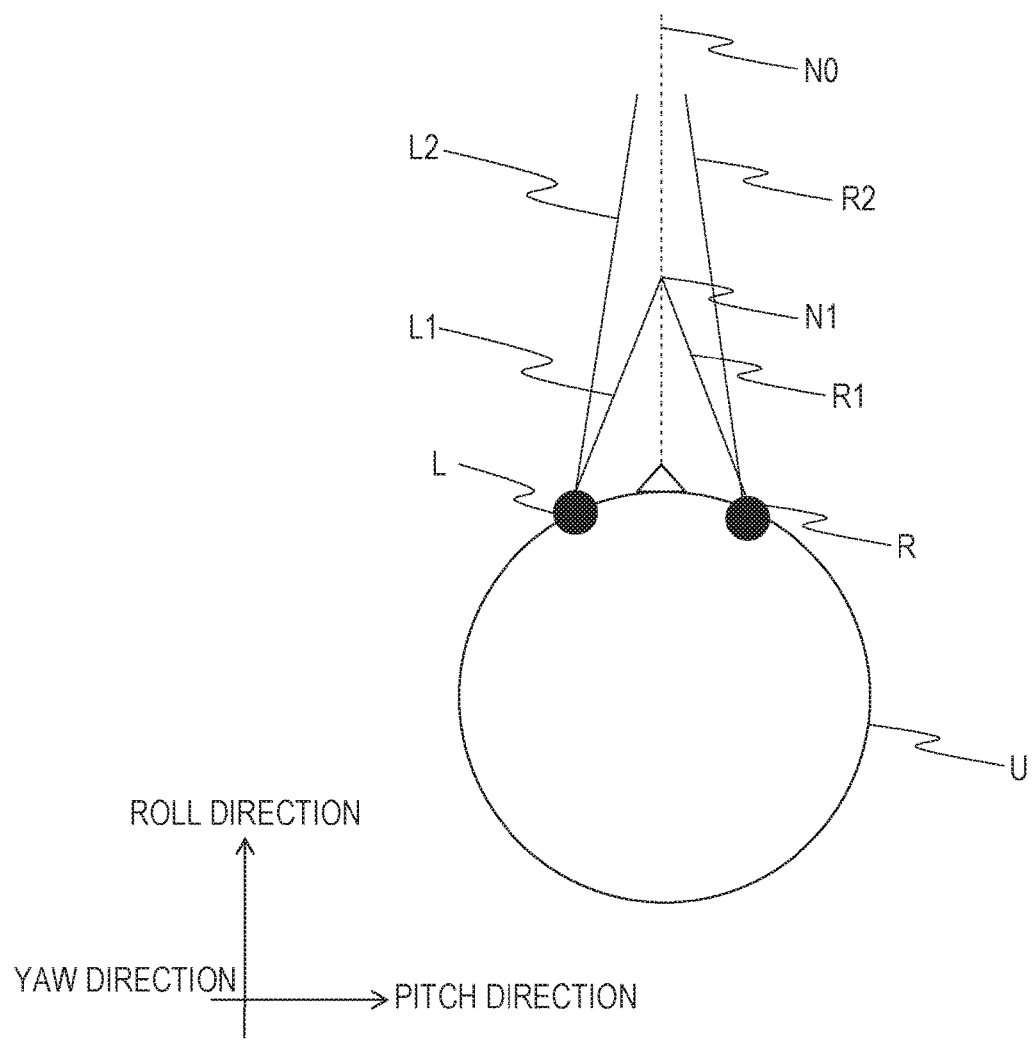
FIG. 5 is a diagram of at least one example of a method of determining a line-of-sight direction.

As illustrated in FIG. 5, the eye gaze sensor 140 is configured to detect line-of-sight directions of a right eye R and a left eye L of a user U. When the user U is looking at a near place, lines of sight R1 and L1 are detected, and a point of gaze N1 being an intersection of the lines of sight R1 and L1 is specified. Further, when the user is looking at a far place, lines of sight R2 and L2, which form smaller angles with the roll direction as compared to the lines of sight R1 and L1, are specified. After the point of gaze N1 is specified, a line-of-sight direction N0 of the user U is specified. The line-of-sight direction N0 is a direction in which the slight line of the user U is actually directed with both eyes. The line-of-sight direction N0 is defined as, for example, an extension direction of a straight line that passes through the point of gaze N1 and the midpoint of the right eye R and the left eye L of the user U.

With reference to FIG. 6A and FIG. 6B, description is given of the field of view region 408 whose image is taken by the first virtual camera pair 404A. FIG. 6A is a YZ plane diagram obtained by viewing the field of view region 408 from the X direction, and FIG. 6B is an XZ plane diagram obtained by viewing the field of view region 408 from the Y direction. The field of view region 408 has a first region 414 (see FIG. 6A) that is a range defined by the reference slight line 412 and a YZ cross section of a virtual space image 410, and a second region 416 (see FIG. 6B) that is a range defined by the reference slight line 412 and an XZ cross section of the virtual space image 410. The first region 414 is defined as a range of a polar angle $\alpha$ or more from the reference slight line 412 serving as the center. The second region 416 is defined as a range of an azimuth $\beta$ or more from the reference slight line 412 serving as the center.

Figure 7:
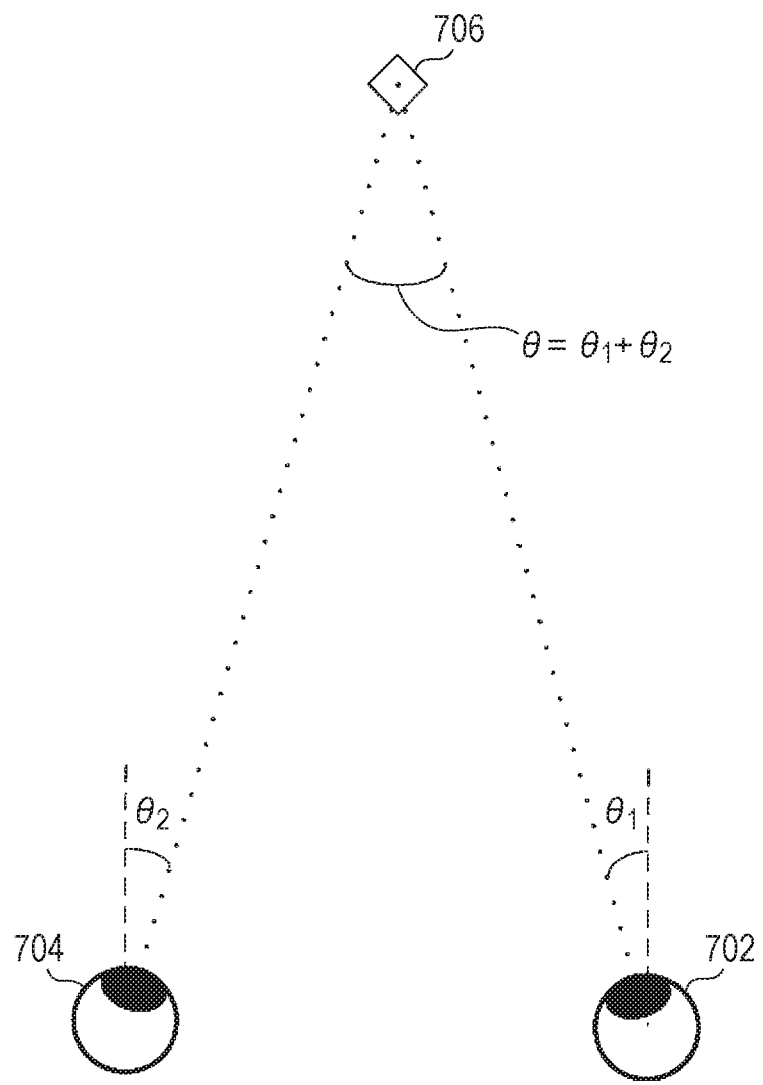
FIG. 7 is a diagram of a principle of achieving stereopsis.
Figure 8:
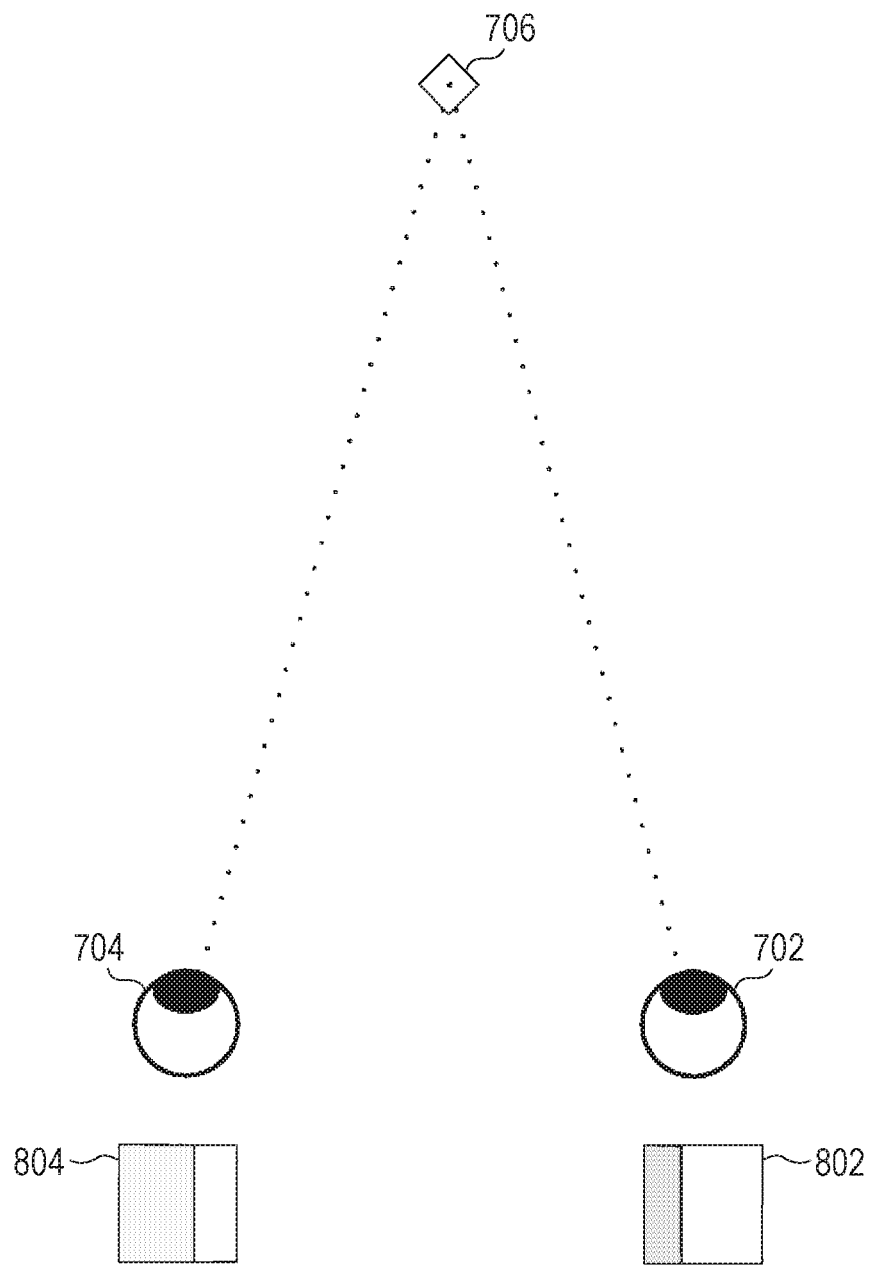
FIG. 8 is a diagram of the principle of achieving stereopsis.

Now, with reference to FIG. 7 and FIG. 8, description is given of a principle of achieving stereopsis. In FIG. 7, a right eye 702 and a left eye 704 are looking at an object 706 arranged in front of the eyes. The right eye 702 and the left eye 704 rotate inward by an angle $\theta_1$ and an angle $\theta_2$, respectively, in order to look at the object 706. As the distance to the object 706 is decreased, $\theta$ corresponding to the sum of $\theta_1$ and $\theta_2$ is increased. As the distance to the object 706 is increased, $\theta$ is decreased. This angle $\theta$ is called binocular parallax.

FIG. 8 is also a diagram for illustrating the principle of achieving stereopsis. Similarly to FIG. 7, the right eye 702 and the left eye 704 are looking at the object 706. The positional relationship between the object 706 and the right eye 702 is different from the positional relationship between the object 706 and the left eye 704. Therefore, as illustrated in FIG. 8, an image 802 of the object 706 viewed by the right eye 702 is different from an image 804 viewed by the left eye 704. Such a difference of the images viewed by the right eye and the left eye is called binocular disparity. As the distance to the object 706 is decreased, the binocular disparity is increased. As the distance to the object 706 is increased, the binocular disparity is decreased.

In a real space, a human being obtains stereopsis mainly based on those two principles. As described above, the HMD 110 used in at least one embodiment of this disclosure includes the right-eye display unit and the left-eye display unit. Such a device can obtain the effect of stereopsis by giving a difference corresponding to the binocular parallax or the binocular disparity to the images to be displayed on the respective display units. The above-mentioned binocular parallax and binocular disparity are herein collectively referred to as a "parallax".

Figure 9:
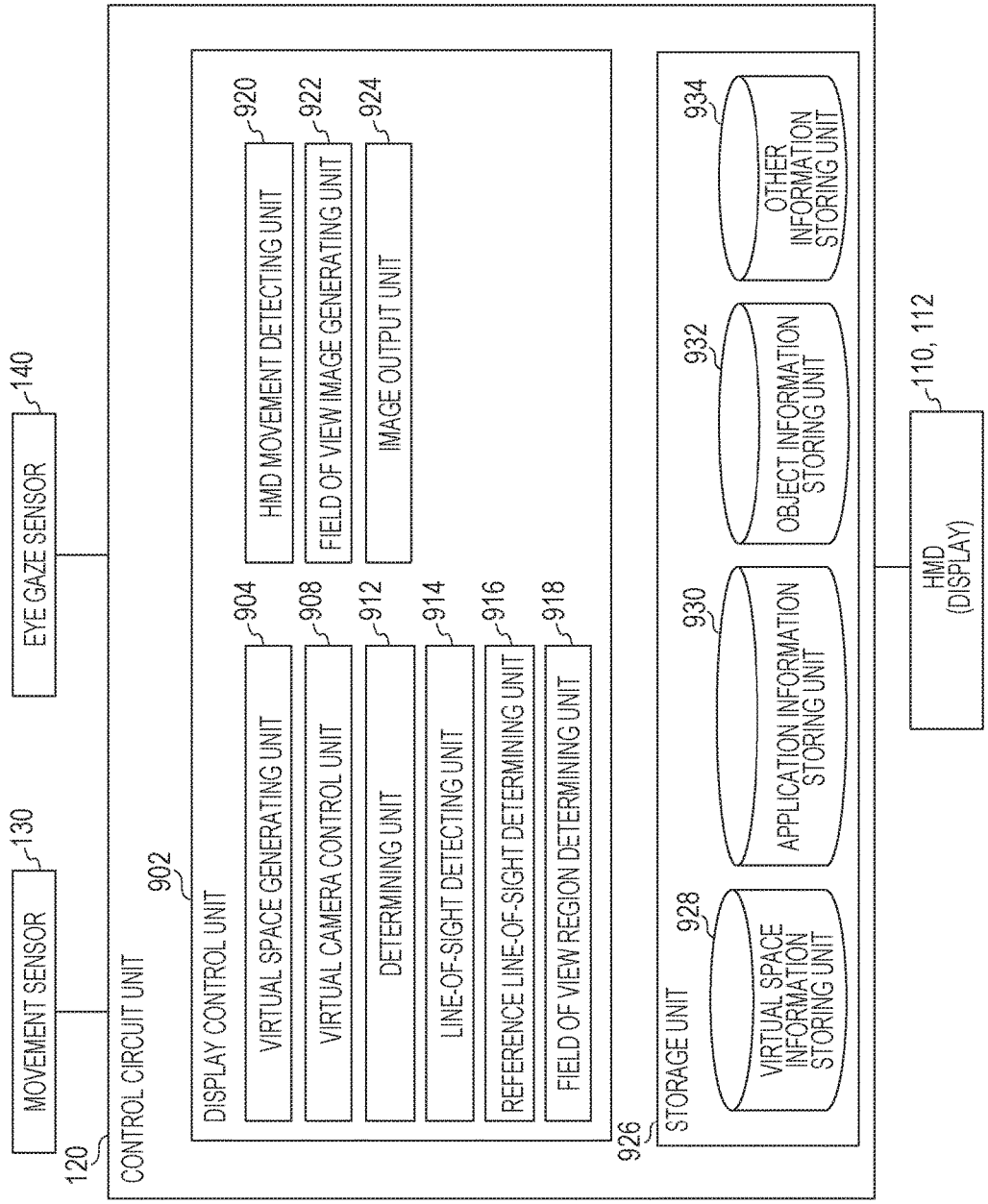
FIG. 9 is a block diagram of hardware implemented functionality of the control circuit unit, for achieving processing of displaying a virtual space or the like in the HMD system.

FIG. 9 is a block diagram of hardware implemented functionality of the control circuit unit 120, for achieving, for example, the processing of displaying the virtual space 402 in the HMD system 100. The control circuit unit 120 is configured to control an image to be output to the display 112 mainly based on the input from the movement sensor 130 and the sensor 140.

The control circuit unit 120 includes a display control unit 902 and a storage unit 926. The display control unit 902 includes a virtual space generating unit 904, a virtual camera control unit 908, a determining unit 912, a line-of-sight detecting unit 914, a reference line-of-sight determining unit 916, a field of view region determining unit 918, an HMD movement detecting unit 920, a field of view image generating unit 922, and an image output unit 924. The storage unit 926 may be configured to store various types of information. As an example, the storage unit 926 may include a virtual space information storing unit 928, an application information storing unit 930, an object information storing unit 932, and another information storing unit 934. The storage unit 926 may further include various types of data necessary for calculation for providing, to the display 112, output information corresponding to the input from the movement sensor 130 or the eye gaze sensor 140. The object information storing unit 932 may store a display object to be arranged in the virtual space, and a 3D object (for example, a 3D content including at least one of a 3D text, a 3D image, or a 3D moving image) to be displayed on the display object.

Figure 10:
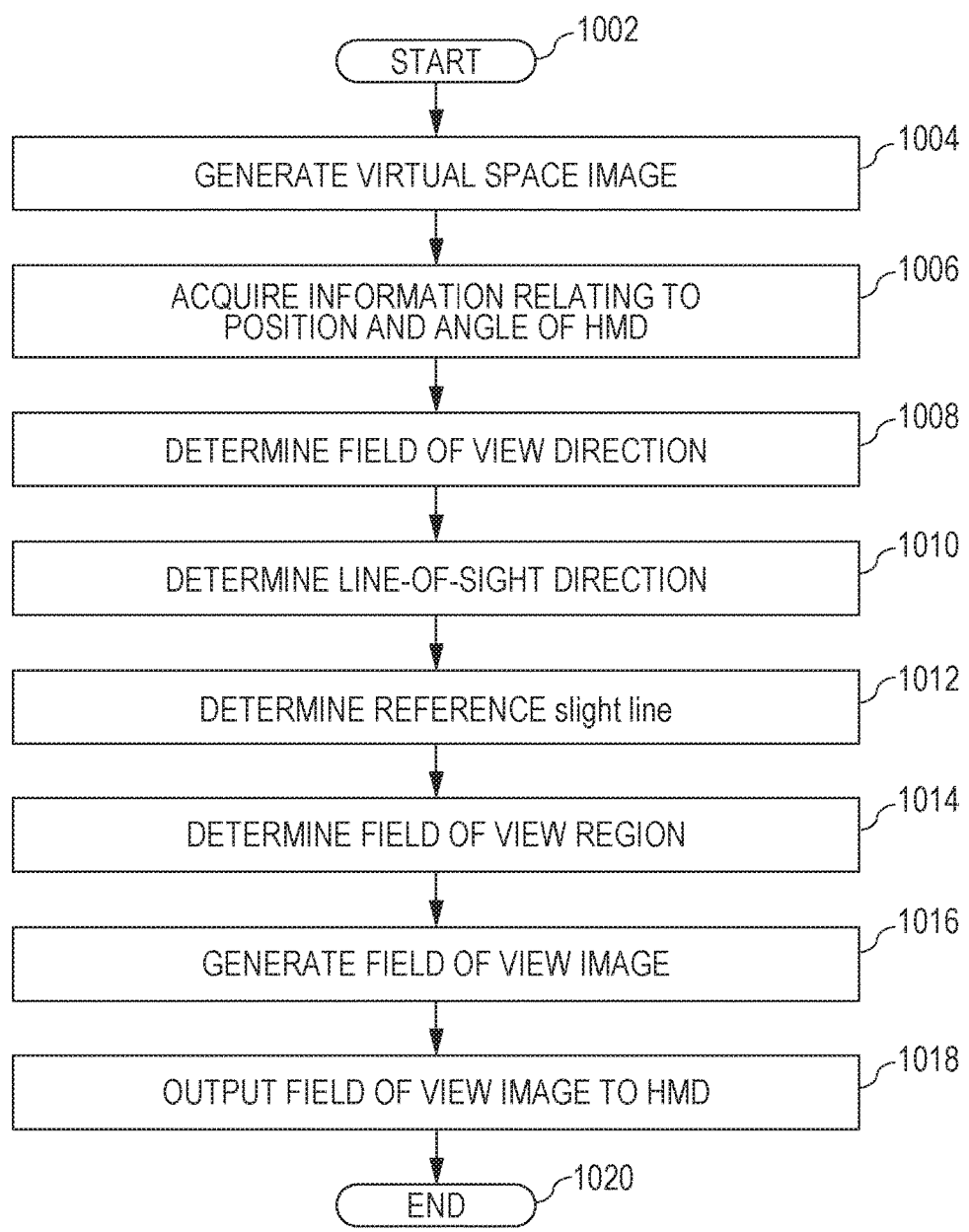
FIG. 10 is a flow chart of a method of general processing for displaying an image of a virtual space, in which the user is immersed, on the HMD.

FIG. 10 is a flow chart of a method of general processing for displaying an image of a virtual space, in which the user is immersed, on the HMD 110.

With reference to FIG. 9 and FIG. 10, description is given of the general processing of the HMD system 100 for providing the image of the virtual space. The virtual space 402 may be provided through interaction between the HMD 110 (eye gaze sensor 140 or movement sensor 130) and the control circuit unit 120.

The processing starts in Step 1002. As an example, a game application stored in the application information storing unit 930 may be executed by the control circuit unit 120. In Step 1004, the control circuit unit 120 (virtual space generating unit 904) refers to the virtual space information storing unit 928 or the like to generate the celestial sphere-shaped virtual space image 410 (see FIG. 4) forming the virtual space 402, in which the user is immersed. The movement sensor 130 detects the position and the inclination of the HMD 110. The information detected by the movement sensor 130 is transmitted to the control circuit unit 120. In Step 1006, the HMD movement detecting unit 920 acquires the position information and the inclination information of the HMD 110. In Step 1008, the field of view direction is determined based on the acquired position information and inclination information.

When the eye gaze sensor 140 detects the movement of the eyeballs of the right and left eyes of the user, information on the movement is transmitted to the control circuit unit 120. In Step 1010, the line-of-sight detecting unit 914 specifies the directions of the lines of sight of the right eye and the left eye to determine the line-of-sight direction N0. In Step 1012, the reference line-of-sight determining unit 916 determines, as the reference slight line 412, the line-of-sight direction N0 of the user or the field of view direction determined based on the inclination of the HMD 110. The reference slight line 412 may be further determined based on the position and the inclination of the first virtual camera pair 404A that follows the position and the inclination of the HMD 110.

In Step 1014, the field of view region determining unit 918 determines the field of view region 408 of the first virtual camera pair 404A in the virtual space 402. As illustrated in FIG. 4, the field of view region 408 is a part (field of view image 418) forming the field of view of the user in the virtual space image 410. The field of view region 408 is determined based on the reference slight line 412. A YZ plane diagram obtained by viewing the field of view region 408 from the X direction and an XZ plane diagram obtained by viewing the field of view region 408 from the Y direction are illustrated respectively in FIG. 6A and FIG. 6B referred to above.

In Step 1016, the field of view image generating unit 922 generates the field of view image 418 based on the field of view region 408. The field of view image 418 includes two two-dimensional images for the right eye and the left eye. Those two-dimensional images are superimposed on the display 112 (more specifically, the right-eye image is output to the right-eye display unit, and the left-eye image is output to the left-eye display unit) so that the virtual space 402 being a three-dimensional image is provided to the user. In Step 1018, the image output unit 924 outputs the information relating to the field of view image 418 to the HMD 110. The HMD 110 displays the field of view image 418 on the display 112 based on the received information of the field of view image 418. The processing ends in Step 1020.

Figure 11:
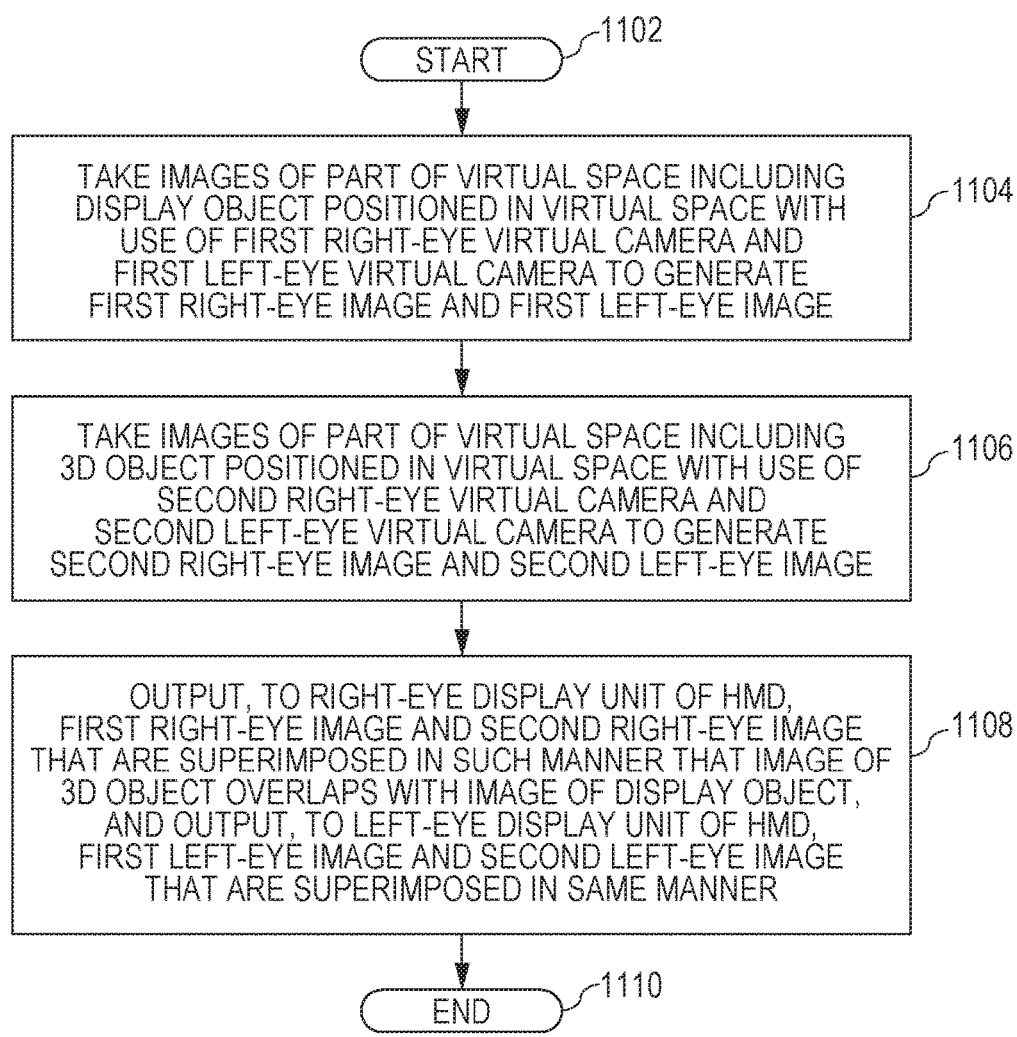
FIG. 11 is a flow chart of a method of basic processing for providing an image of a virtual space, in which the user is immersed, to the HMD, which is achieved by a method according to at least one embodiment of this disclosure.

FIG. 11 is a flow chart of a method of basic processing for providing an image of a virtual space, in which the user is immersed, to the HMD 110, which is achieved by a method according to at least one embodiment of this disclosure. The processing of FIG. 11 may be executed by a system for causing a computer to execute the method according to at least one embodiment of this disclosure. With the processing described with reference to FIG. 10, the field of view image 418 in the application at the initial position and the initial angle of the HMD 110 is generated, output to the HMD 110, and displayed on the HMD 110 in advance. As described later, in at least one embodiment of this disclosure, a second virtual camera pair 404B including a second right-eye virtual camera 404B-1 and a second left-eye virtual camera 404B-2 is arranged in the virtual space in addition to the first virtual camera pair 404A, and the second virtual camera pair 404B is configured to take an image of apart of the virtual space or an object, which is different from the part or object whose image is taken by the first virtual camera pair 404A.

In response to a specific event, processing will shift to the processing in FIG. 11, in at least one embodiment. For example, the control circuit unit 120 may shift the processing to that illustrated in FIG. 11 in response to the determination of the display control unit 902 (line-of-sight detecting unit 914, reference line-of-sight determining unit 916, field of view region determining unit 918, HMD movement detecting unit 920, or other units) that the user has come close to a position at which the display object is arranged in the virtual space 402 within a distance of a predetermined threshold from the position. Further, the control circuit unit 120 may shift the processing to that in FIG. 11 in response to some kind of action of the user to the display object in the virtual space 402 (for example, contact to the display object, contact to an object for activating the display object, and the like). One of ordinary skill in the art would understand that various events for shifting the processing to that of FIG. 11 according to at least one embodiment of this disclosure are conceivable. The processing starts in Step 1102. In Step 1104, the virtual camera control unit 908 takes images of a part of the virtual space 402 including the display object positioned in the virtual space 402 with use of the first virtual camera pair 404A including the first right-eye virtual camera 404A-1 and the first left-eye virtual camera 404A-2. At this time, the image of the field of view region 408 based on the reference slight line 412 determined by the reference line-of-sight determining unit 916 is taken. The field of view image generating unit 922 generates a first right-eye image based on the image taken by the first right-eye virtual camera 404A-1, and generates a first left-eye image based on the image taken by the first left-eye virtual camera 404A-2.

In Step 1106, the virtual camera control unit 908 takes images of a part of the virtual space 402 including a 3D object (for example, a three-dimensional content including at least one of a 3D text, a 3D image, or a 3D moving image) positioned in the virtual space 402 (or a different virtual space as described later) with use of the second right-eye virtual camera 404B-1 and the second left-eye virtual camera 404B-2. The field of view image generating unit 922 generates a second right-eye image based on the image taken by the second right-eye virtual camera 404B-1, and generates a second left-eye image based on the image taken by the second left-eye virtual camera 404B-2.

In Step 1108, the image output unit 924 outputs, to the right-eye display unit of the HMD 110, the first right-eye image and the second right-eye image that are superimposed in such a manner that the generated image of the 3D object overlaps with the generated image of the display object, and outputs, to the left-eye display unit of the HMD 110, the first left-eye image and the second left-eye image that are superimposed in the same manner.

Figure 12:
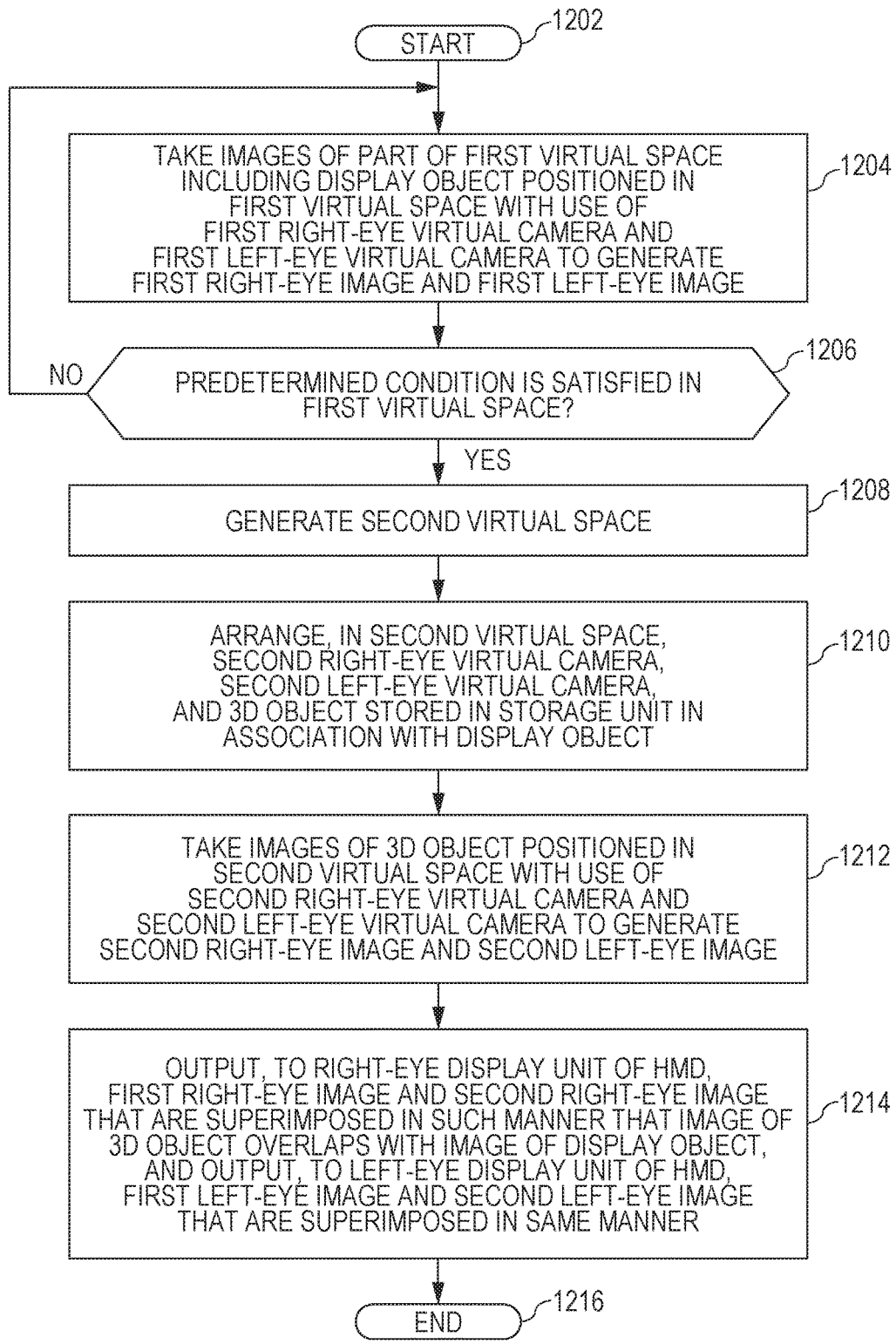
FIG. 12 is a flow chart of a method of a specific example of the basic processing illustrated in FIG. 11 according to at least one embodiment of this disclosure.
Figure 13:
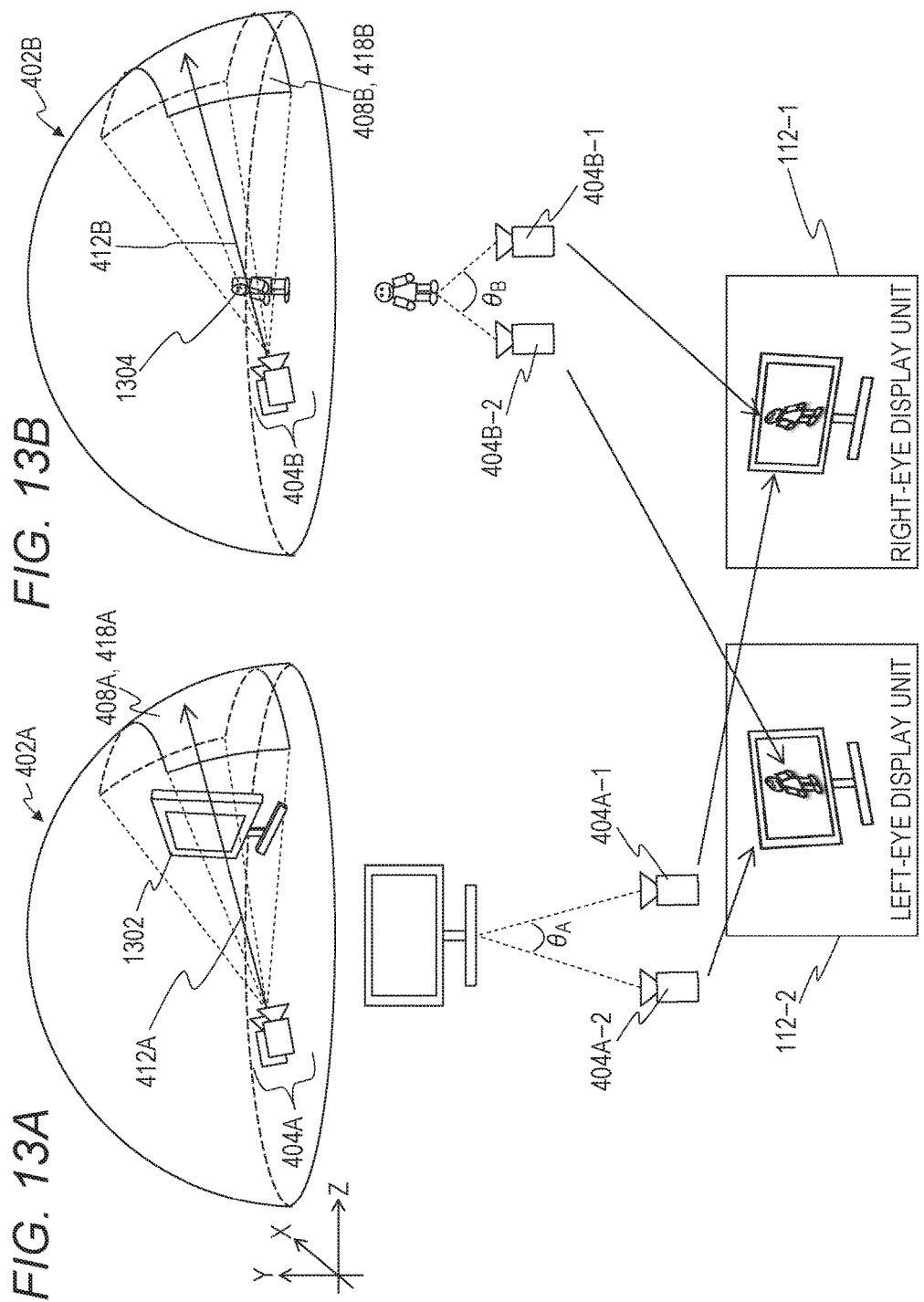
FIG. 13A and FIG. 13B are schematic views of a transition from taking images of a display object and a 3D object in the virtual space to outputting the images to a right-eye display unit and a left-eye display unit, which is achievable by the processing of FIG. 12 according to at least one embodiment.

FIG. 12 is a flow chart of at least one example of the basic processing illustrated in FIG. 11 according to at least one embodiment of this disclosure. FIG. 13A and FIG. 13B are schematic views of a transition from taking images of the display object (which is basically a three-dimensional object) and the 3D object in the virtual space to outputting the images to the right-eye display unit and the left-eye display unit, which is achievable by the processing of FIG. 12 according to at least one embodiment. Now, with reference to FIG. 12, FIG. 13A, and FIG. 13B, specific description is given of a method of providing an image of a virtual space, in which a user is immersed, to a head mounted display according to at least one embodiment of this disclosure.

With the processing described with reference to FIG. 10, the field of view image 418 in the application is generated based on the initial position and the initial angle of the HMD 110, output to the HMD 110, and displayed on the HMD 110 in advance.

The processing starts in Step 1202. In Step 1204, as illustrated in the upper part of FIG. 13A, the virtual camera control unit 908 takes images of a part of a first virtual space 402A including a display object 1302 positioned in the first virtual space 402A with use of the first right-eye virtual camera 404A-1 and the first left-eye virtual camera 404A-2 arranged in the first virtual space 402A. The field of view image generating unit 922 generates a first right-eye image for a field of view region 408A based on the image taken by the first right-eye virtual camera 404A-1, and generates a first left-eye image for the field of view region 408A based on the image taken by the first left-eye virtual camera 404A-2. The relationship between the display object 1302 and both of the first right-eye virtual camera 404A-1 and the first left-eye virtual camera 404A-2 is schematically illustrated in the middle part of FIG. 13A. The first right-eye virtual camera 404A-1 and the first left-eye virtual camera 404A-2 have a relationship of a parallax (binocular parallax) $\theta_A$ with respect to the display object 1302. The binocular parallax is used here as the parallax, but other values known by those skilled in the art, such as the binocular disparity illustrated in FIG. 8, may be used as the parallax.

In Step 1206, the determining unit 912 determines whether or not a predetermined condition is satisfied in the first virtual space 402A. The predetermined condition may be, for example, including the display object 1302 in the field of view region 408A. Specifically, the reference line-of-sight determining unit 916 may specify a user's reference slight line 412A of the HMD 110, and the field of view region determining unit 918 may determine the field of view region 408A in the first virtual space 402A based on the specified reference slight line. Then, the determining unit 912 may determine whether or not the display object 1302 is included in the determined field of view region 408A, and when the display object 1302 is included in the determined field of view region 408A, the determining unit 912 may determine that the predetermined condition is satisfied. This processing is only an example of the predetermined condition in Step 1206. For example, the predetermined condition may be a predetermined action performed in the virtual space by the user with respect to the display object 1302 or some kind of object relating to the display object 1302. One of ordinary skill in the art would understand that other various conditions may be used as the above-mentioned predetermined condition.

When the predetermined condition is not satisfied ("N" in Step 1206), the processing may return to Step 1204. When the predetermined condition is satisfied ("Y" in Step 1206), the processing proceeds to Step 1208. In Step 1208, the virtual space generating unit 904 generates a second virtual space 402B that is different from the first virtual space 402A as illustrated in FIG. 13B based on the virtual space information or the like stored in the virtual space information storing unit 928 or the like in the storage unit 926. As an example, a celestial sphere-shaped virtual space having nothing inside may be generated as the second virtual space 402B.

In Step 1210, as illustrated in the upper part of FIG. 13B, the virtual space generating unit 904 arranges, in the second virtual space 402B, the second virtual camera pair 404B including the second right-eye virtual camera 404B-1 and the second left-eye virtual camera 404B-2, and a 3D object 1304 stored in the object information storing unit 932 or the like of the storage unit 926 in association with the display object 1302. The relationship between the 3D object 1304 and both of the second right-eye virtual camera 404B-1 and the second left-eye virtual camera 404B-2 is schematically illustrated in the middle part of FIG. 13B. The second right-eye virtual camera 404B-1 and the second left-eye virtual camera 404B-2 have a relationship of a parallax (binocular parallax) $\theta_B$ with respect to the 3D object 1304. At this time, the parallax $\theta_B$ may be defined to be larger than the parallax $\theta_A$ between the first right-eye virtual camera 404A-1 and the first left-eye virtual camera 404A-2 with respect to the display object 1302.

The inclinations of the first right-eye virtual camera 404A-1 and the first left-eye virtual camera 404A-2 in the virtual space 402A, and the inclinations of the second right-eye virtual camera 404B-1 and the second left-eye virtual camera 404B-2 in the virtual space 402B may be controlled to be changed depending on the inclination of the HMD 110. For example, the reference slight line 412A of the first virtual camera pair 404A and the reference slight line 412B of the second virtual camera pair 404B may be controlled to point the same direction while following the inclination of the HMD 110 detected by the display control unit 902.

In Step 1212, as illustrated in the upper part of FIG. 13B, the virtual camera control unit 908 takes images of a part of the second virtual space 402B (for example, a field of view region 408B) including the 3D object 1304 positioned in the second virtual space 402B with use of the second right-eye virtual camera 404B-1 and the second left-eye virtual camera 404B-2 arranged in the second virtual space 402B. The field of view image generating unit 922 generates a second right-eye image based on the image taken by the second right-eye virtual camera 404B-1, and generates a second left-eye image based on the image taken by the second left-eye virtual camera 404B-2.

In Step 1214, as illustrated in the lower parts of FIGS. 13A and 13B, the image output unit 924 outputs, to a right-eye display unit 112-1 of the HMD 110, the first right-eye image (including the image of the display object 1302) that is based on the image taken by the first right-eye virtual camera 404A-1 and the second right-eye image (including the image of the 3D object 1304) that is based on the image taken by the second right-eye virtual camera 404B-1, which are superimposed in such a manner that the image of the 3D object 1304 overlaps with the image of the display object 1302. Further, the image output unit 924 outputs, to a left-eye display unit 112-2 of the HMD 110, the first left-eye image (including the image of the display object 1302) that is based on the image taken by the first left-eye virtual camera 404A-2 and the second left-eye image (including the image of the 3D object 1304) that is based on the image taken by the second left-eye virtual camera 404B-2, which are superimposed in the same manner. The processing ends in Step 1216.

Figure 14:
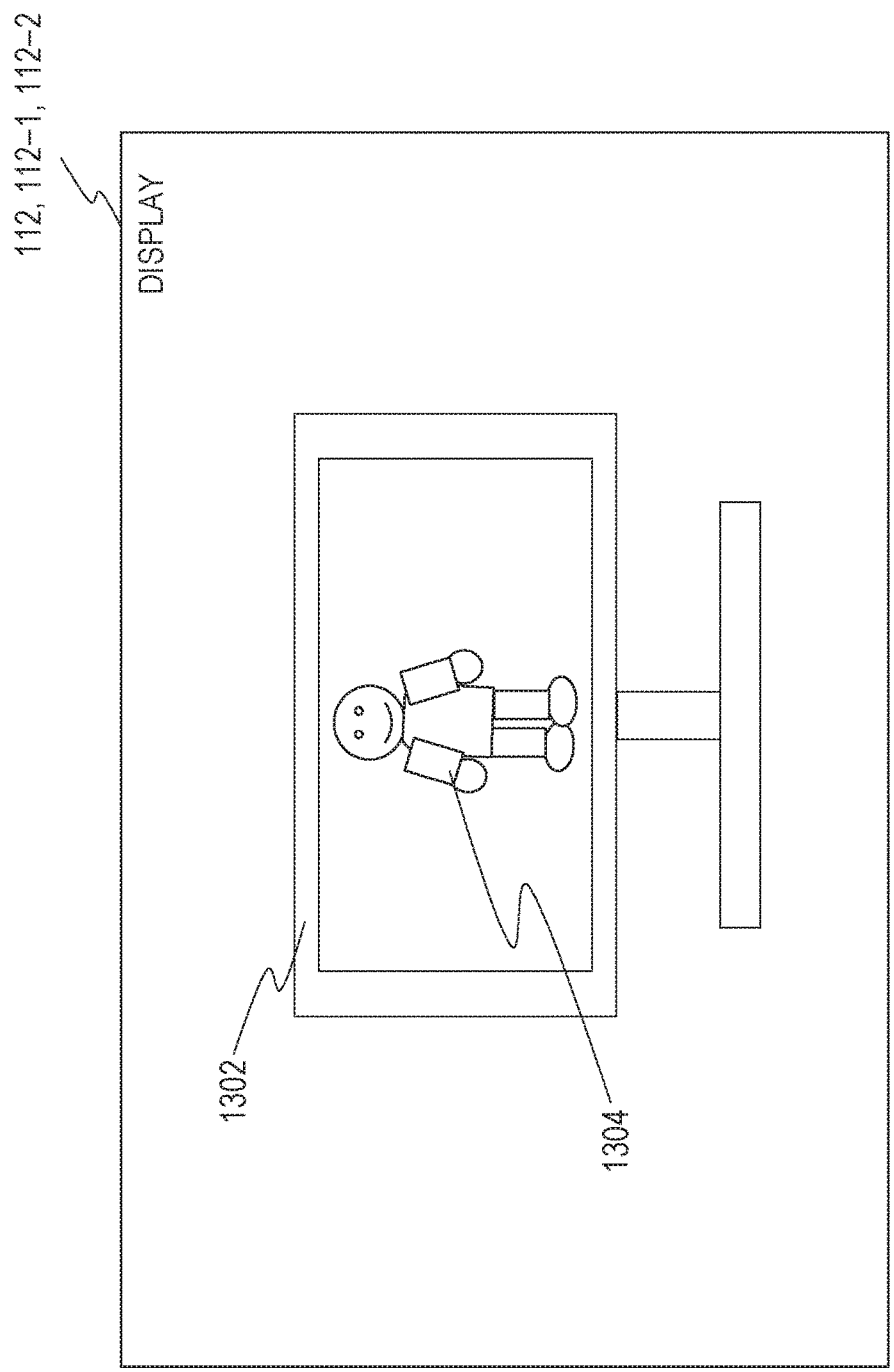
FIG. 14 is a diagram of at least one example of an image of the virtual space viewable via a display, which is generated based on the processing illustrated in FIG. 12, FIG. 13A, and FIG. 13B according to at least one embodiment.

FIG. 14 is at least one example of an image of the virtual space that can be seen via the display 112 (right-eye display unit 112-1 and left-eye display unit 112-2), which is generated by the processing described with reference to FIG. 12, FIG. 13A, and FIG. 13B. With the parallax $\theta_A$ between the first right-eye virtual camera 404A-1 and the first left-eye virtual camera 404A-2 with respect to the display object 1302, the user wearing the HMD 110 can see the 3D display object 1302 as being arranged in the virtual space. Further, with the parallax $\theta_B$ between the second right-eye virtual camera 404B-1 and the second left-eye virtual camera 404B-2 with respect to the 3D object 1304, the user can see the 3D object 1304 as being displayed in the screen of the 3D display object 1302. Further, the parallax $\theta_B$ is defined to be larger than the parallax $\theta_A$, and hence the 3D object 1304 looks like coming out from the screen of the 3D display object 1302. In at least one example, the 3D object 1304 is a 3D character image. Alternatively, when a 3D moving-image content is used as the 3D object 1304, a 3D moving-image can be viewed in the virtual reality space.

As described above, according to at least one embodiment of this disclosure, a 3D display similar to that in the real space is achievable in the virtual space. Therefore, in the virtual space, the information desired to be provided to the user can be displayed much more effectively than in the related art while maintaining a high-level user experience. Further, according to at least one embodiment of this disclosure, only the image of the 3D object to be displayed in a three-dimensional manner on the screen of the 3D display object is updated, and the image of the 3D display object is not continuously updated. Therefore, as compared to the case where the related art is used, a rendering load is reduced and content production is facilitated.

Figure 15:
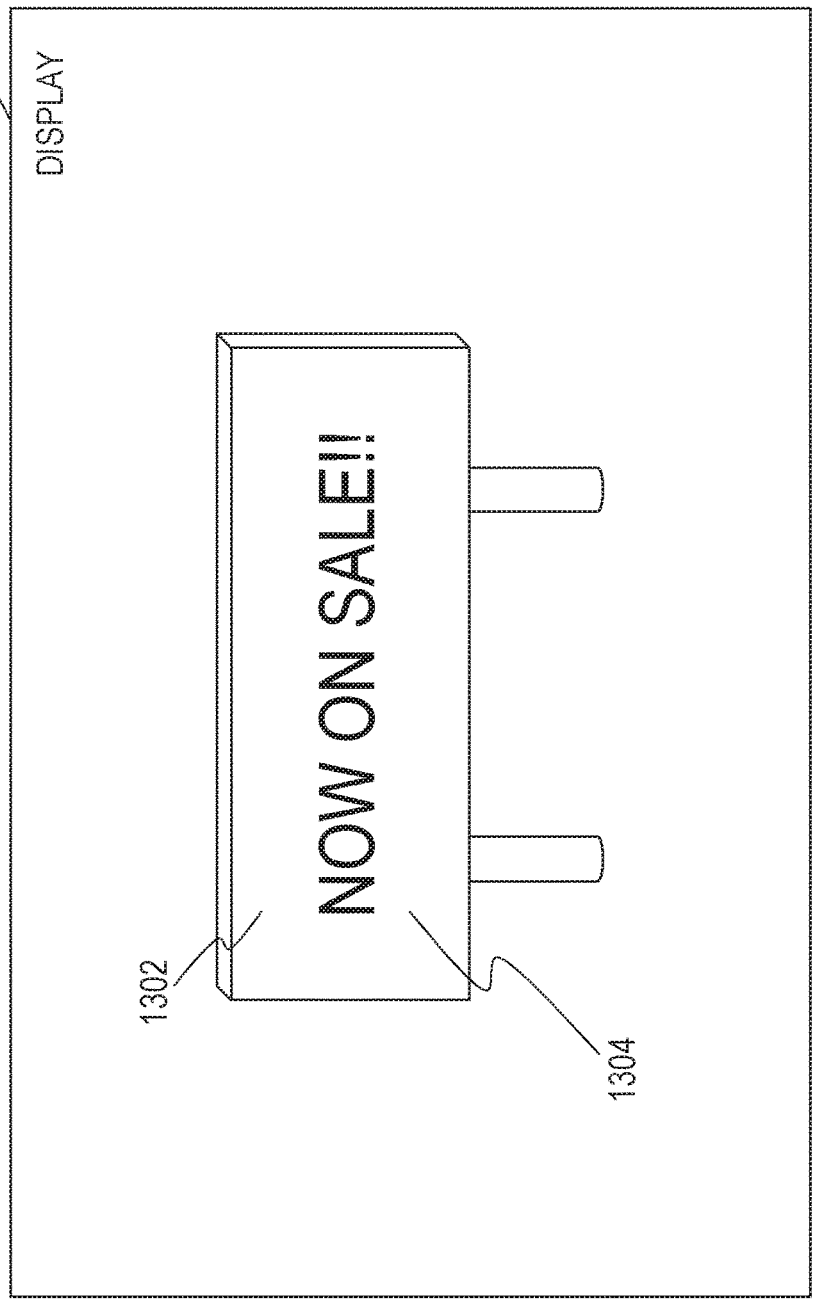
FIG. 15 is a diagram of at least one example of an image of the virtual space viewable via the display, which is generated based on the processing illustrated in FIG. 12, FIG. 13A, and FIG. 13B according to at least one embodiment.

The 3D display object 1302 and the 3D object 1304 illustrated in FIG. 14 are merely examples, and according to this disclosure, those objects may have various modes. For example, as illustrated in FIG. 15, the 3D display object 1302 may have a mode as a billboard, and the 3D object 1304 may have a mode as a text advertisement. One of ordinary skill in the art would understand that the 3D display object 1302 and the 3D object 1304 having other various modes is achievable.

Figure 16:
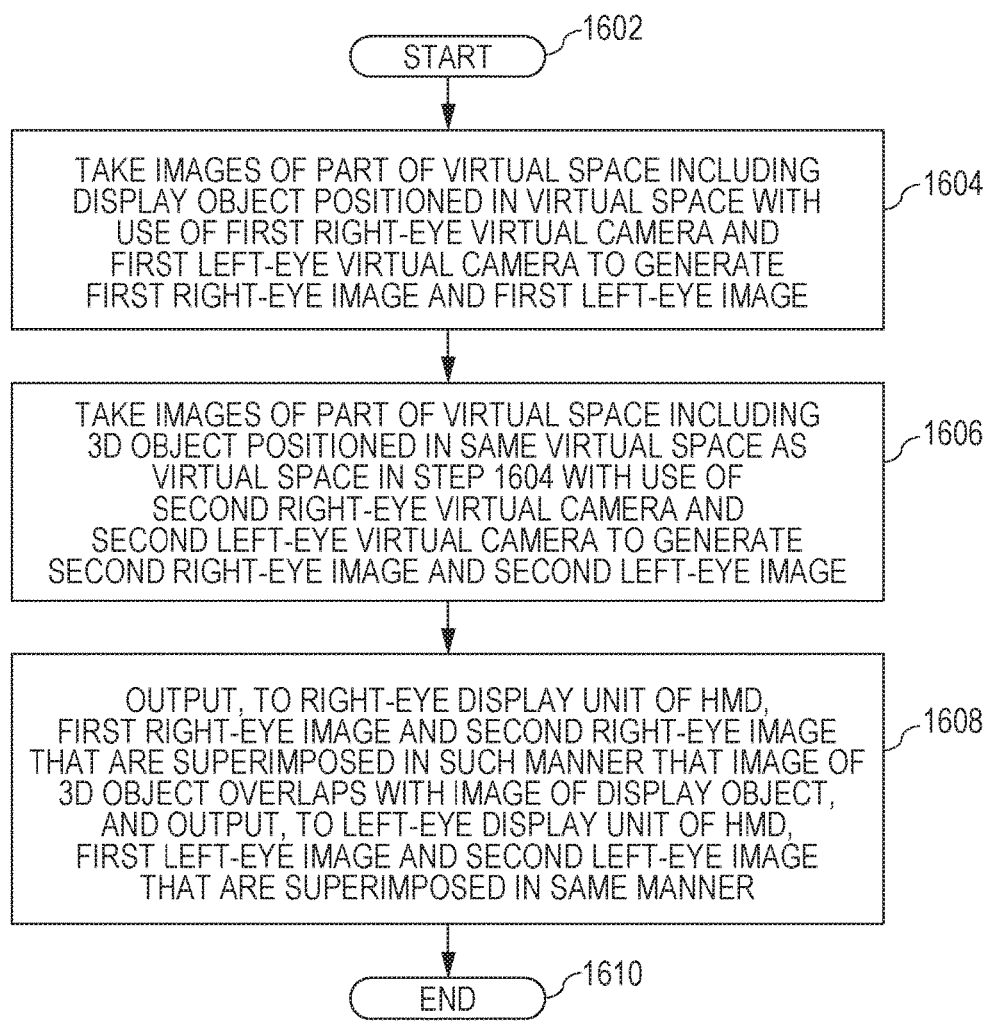
FIG. 16 is a flow chart of a method of the basic processing illustrated in FIG. 11 according to at least one embodiment of this disclosure.
Figure 17:
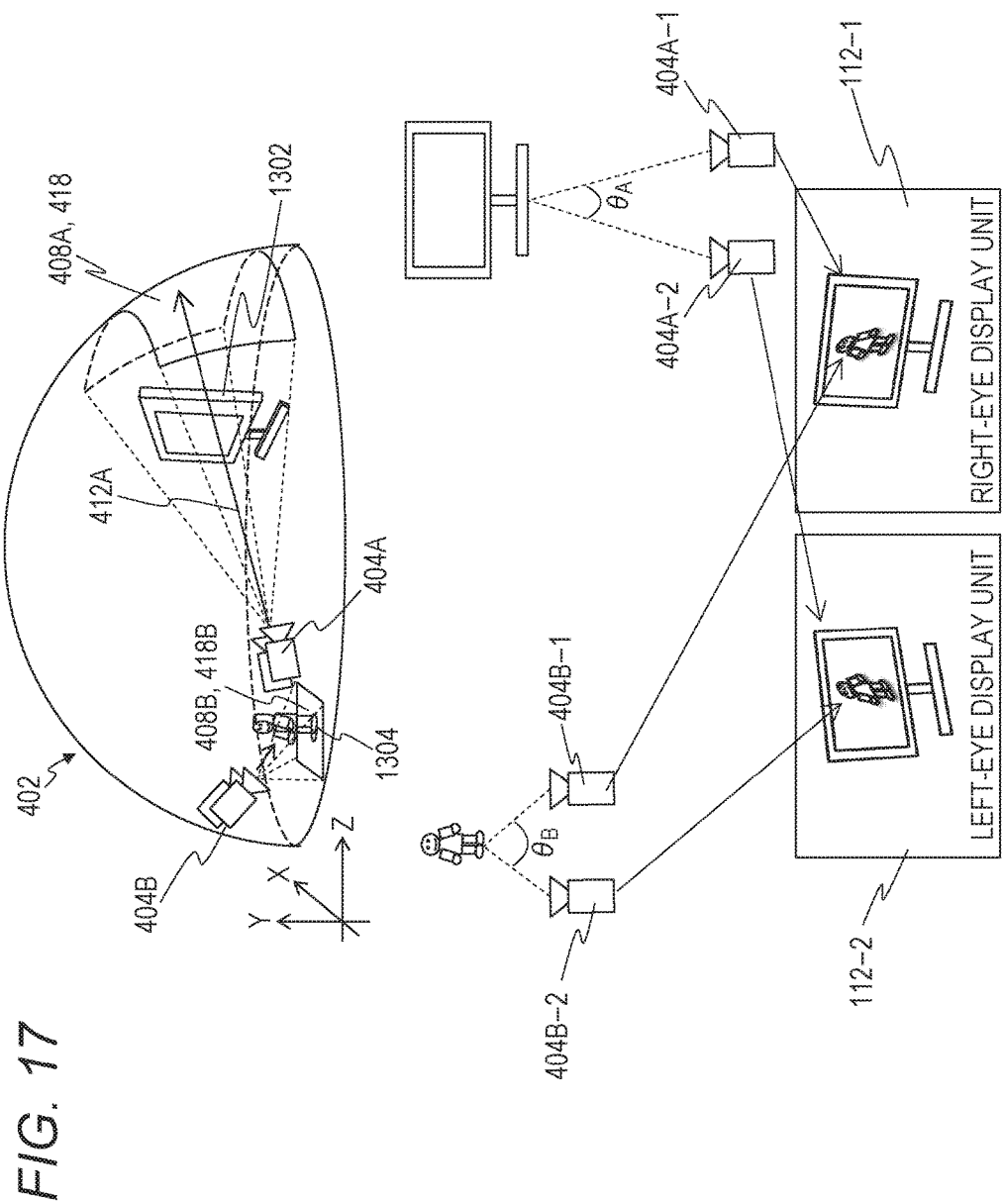
FIG. 17 is a schematic view of a transition from taking images of the display object and the 3D object in the virtual space to outputting the images to the right-eye display unit and the left-eye display unit, which is achievable by the processing of FIG. 16.

FIG. 16 is a flow chart of at least one example of the basic processing illustrated in FIG. 11 according to at least one embodiment of this disclosure. FIG. 17 is a schematic view of a transition from taking images of the display object and the 3D object in the virtual space to outputting the images to the right-eye display unit and the left-eye display unit, which is achieved by the processing of FIG. 16 according to at least one embodiment. Now, with reference to FIG. 16 and FIG. 17, specific description is given of the method of providing an image of a virtual space, in which a user is immersed, to the HMD according to at least one embodiment of this disclosure.

Similarly to the example of FIG. 12, FIG. 13A, and FIG. 13B, with the processing described with reference to FIG. 10, the field of view image 418 in the application is generated based on the initial position and the initial angle of the HMD 110 and displayed on the HMD 110 in advance. Meanwhile, unlike the example of FIG. 12, FIG. 13A, and FIG. 13B, in at least one embodiment, as illustrated in the upper part of FIG. 17, the first virtual camera pair 404A, the second virtual camera pair 404B, the display object 1302, and the 3D object 1304 are arranged in the same virtual space 402.

The processing starts in Step 1602. In Step 1604, as illustrated in the upper part of FIG. 17A, the virtual camera control unit 908 takes images of a part of the virtual space 402 including the display object 1302 positioned in the virtual space 402 with use of the first right-eye virtual camera 404A arranged in the virtual space 402. The field of view image generating unit 922 generates a first right-eye image for the field of view region 408A based on the image taken by the first right-eye virtual camera 404A-1, and generates a first left-eye image for the field of view region 408A based on the image taken by the first left-eye virtual camera 404A-2. The relationship between the display object 1302 and both of the first right-eye virtual camera 404A-1 and the first left-eye virtual camera 404A-2 is schematically illustrated in the middle part of FIG. 17. The first right-eye virtual camera 404A-1 and the first left-eye virtual camera 404A-2 have a relationship of the parallax (binocular parallax) $\theta_A$ with respect to the display object 1302. Other values known by those skilled in the art, such as the binocular disparity illustrated in FIG. 8, may be used as the parallax.

Subsequently, in Step 1606, as illustrated in the upper part of FIG. 17, the virtual camera control unit 908 takes images of a part of the virtual space 402 including the 3D object 1304 positioned in the same virtual space 402 as in the case of Step 1604 with use of the second virtual camera pair 404B. The field of view image generating unit 922 generates the second right-eye image for the field of view region 408B based on the image taken by the second right-eye virtual camera 404B-1, and generates the second left-eye image for the field of view region 408B based on the image taken by the second left-eye virtual camera 404B-2. The relationship between the 3D object 1304 and both of the second right-eye virtual camera 404B-1 and the second left-eye virtual camera 404B-2 is schematically illustrated in the middle part of FIG. 17. The second right-eye virtual camera 404B-1 and the second left-eye virtual camera 404B-2 are arranged so as to have the parallax (binocular parallax) $\theta_B$ with respect to the 3D object 1304. The parallax $\theta_B$ may be defined to be larger than the parallax $\theta_A$. The processing of Step 1606 may be executed when it is determined that a predetermined condition is satisfied. The predetermined condition may be, for example, including the display object 1302 in the field of view region 408A.

The inclinations of the first right-eye virtual camera 404A-1 and the first left-eye virtual camera 404A-2 and/or the inclinations of the second right-eye virtual camera 404B-1 and the second left-eye virtual camera 404B-2 in the virtual space 402 may be controlled so as to be changed depending on the position and the inclination of the HMD 110. For example, the reference slight line 412A of the first virtual camera pair 404A may be controlled so as to follow the inclination of the HMD 110 detected by the display control unit 902. The reference slight line (not shown) of the second virtual camera pair 404B may be controlled so as to change variously based on the inclination of the HMD 110, or may be fixed.

In Step 1608, as illustrated in the lower part of FIG. 17, the image output unit 924 outputs, to the right-eye display unit 112-1 of the HMD 11, the first right-eye image (including the image of the display object 1302) that is based on the image taken by the first right-eye virtual camera 404A-1 and the second right-eye image (including the image of the 3D object 1304) that is based on the image taken by the second right-eye virtual camera 404B-1, which are superimposed in such a manner that the image of the 3D object 1304 overlaps with the image of the display object 1302. Further, the image output unit 924 outputs, to the left-eye display unit 112-2 of the HMD 110, the first left-eye image (including the image of the display object 1302) that is based on the image taken by the first left-eye virtual camera 404A-2 and the second left-eye image (including the image of the 3D object 1304)

that is based on the image taken by the second left-eye virtual camera 404B-2, which are superimposed in the same manner. The processing ends in Step 1610.

With the processing described with reference to FIG. 16 and FIG. 17, as at least one example, the image as illustrated in FIG. 14 is provided to the HMD 110. With the parallax $\theta_A$ between the first right-eye virtual camera 404A-1 and the first left-eye virtual camera 404A-2 with respect to the display object 1302, the user wearing the HMD 110 can see the display object 1302 as being three-dimensionally displayed in the virtual space 402. Further, with the parallax $\theta_B$ between the second right-eye virtual camera 404B-1 and the second left-eye virtual camera 404B-2 with respect to the 3D object 1304, the user can see the image (field of view image 418B) of another place (field of view region 408B) including the 3D object in the same virtual space 402 as being three-dimensionally displayed in the screen of the 3D display object 1302. The parallax $\theta_B$ is defined to be larger than the parallax $\theta_A$, and hence the 3D object 1304 (and the field of view image 418B including the 3D object 1304) looks like coming out from the screen of the 3D display object 1302. As described above, according to at least one embodiment of this disclosure, a 3D display similar to that in the real space can be achieved in the virtual space, and a state of another place in the same virtual space can be three-dimensionally displayed in the screen of the 3D television. Therefore, in the virtual space, the information desired to be provided to the user can be displayed much more effectively than in the related art while maintaining a high-level user experience. As described above, the 3D display object 1302 and the 3D object 1304 illustrated in FIG. 14 are merely examples, and those objects can have various modes according to this disclosure.

According to embodiments of this disclosure described above, when the image of the virtual space, in which the user is immersed, is provided to the HMD, the information desired to be shown to the user can be provided effectively while maintaining the high-level user experience.

The method and the system according to embodiments of this disclosure have been specifically described above, but the above-mentioned embodiments are merely examples, and are not intended to limit the scope of this disclosure. One of ordinary skill in the art would understand that the technical idea of this disclosure can be embodied in various modes including a computer having a configuration similar to that of the control circuit unit 120 in addition to the method and the program. Further, one of ordinary skill in the art would understand that a change, addition, or modification may be appropriately made to the embodiments without departing from the gist and the scope of this disclosure. The scope of this disclosure is to be interpreted based on the description of the appended claims and is to be understood to include equivalents thereof.

What is claimed is:

1. A method comprising:
    defining a virtual space including a display object and a three-dimensional object;
    defining a first pair of virtual cameras in the virtual space including a first right-eye virtual camera and a first left-eye virtual camera;
    defining a second pair of virtual cameras in the virtual space including a second right-eye virtual camera and a second left-eye virtual camera;
    generating a first right-eye image based on the first right-eye virtual camera, and a first left-eye image based on the first left-eye virtual camera, wherein both the first right-eye image and the first left-eye image include a first part of the virtual space and the display object;
    generating a second right-eye image based on the second right-eye virtual camera, and a second left-eye image based on the second left-eye virtual camera, wherein both the second right-eye image and the second left-eye image include a second part of the virtual space and the three-dimensional object;
    superimposing the first right-eye image and the second right-eye image to overlap the three-dimensional object with the display object to form a superimposed right-eye image;
    outputting the superimposed right-eye image to a right-eye display unit of a head mounted display;
    superimposing the first left-eye image and the second left-eye image to overlap the three-dimensional object with the display object to form a superimposed left-eye image; and
    outputting the superimposed left-eye image to a left-eye display unit of a head mounted display.

2. The method according to claim 1, wherein defining the second pair of virtual cameras comprises defining a parallax between the second right-eye virtual camera and the second left-eye virtual camera with respect to the three-dimensional object is defined to be larger than a parallax between the first right-eye virtual camera and the first left-eye virtual camera with respect to the display object.

3. The method according to claim 2,
    wherein defining the first pair of virtual cameras comprises arranging the first right-eye virtual camera and the first left-eye virtual camera in a first virtual space including the display object, and generating the first right-eye image and generating the first left-eye image comprises generating images of a part of the first virtual space and the display object, and
    wherein defining the second pair of virtual cameras comprises arranging the second right-eye virtual camera and the second left-eye virtual camera in a second virtual space that is different from the first virtual space, the second virtual space includes the three-dimensional object, and generating the second right-eye image and generating the second left-eye image comprises generating images of a part of the second virtual space and the three-dimensional object.

4. The method according to claim 3, further comprising determining whether a predetermined condition is satisfied in the first virtual space, and
    in response to a determination that the predetermined condition is satisfied:
    generating the second virtual space; and
    arranging, in the second virtual space, the second right-eye virtual camera, the second left-eye virtual camera and the three-dimensional object that is stored in a storage unit in association with the display object.

5. The method according to claim 4, wherein the determining comprises:
    specifying a reference sight line of a user of the head mounted display;
    determining a region of field of view of the first virtual space based on the reference sight line;
    determining whether the display object is included in the region of field of view; and
    determining that the predetermined condition is satisfied when the display object is included in the region of field of view.

6. The method according to claim 5,
wherein defining the first pair of virtual cameras comprises arranging the first right-eye virtual camera and the first left-eye virtual camera in a same virtual space as the second right eye-virtual camera, the second left-eye virtual camera, the display object and the three-dimensional object.

7. The method according to claim 1,
wherein defining the first pair of virtual cameras comprises arranging the first right-eye virtual camera and the first left-eye virtual camera in a first virtual space including the display object, and generating the first right-eye image and generating the first left-eye image comprises generating images of a part of the first virtual space and the display object, and
wherein defining the second pair of virtual cameras comprises arranging the second right-eye virtual camera and the second left-eye virtual camera in a second virtual space that is different from the first virtual space, the second virtual space includes the three-dimensional object, and generating the second right-eye image and generating the second left-eye image comprises generating images of a part of the second virtual space and the three-dimensional object.

8. The method according to claim 7, further comprising determining whether a predetermined condition is satisfied in the first virtual space, and
in response to a determination that the predetermined condition is satisfied:
generating the second virtual space; and
arranging, in the second virtual space, the second right-eye virtual camera, the second left-eye virtual camera and the three-dimensional object that is stored in a storage unit in association with the display object.

9. The method according to claim 8, wherein the determining comprises:
specifying a reference sight line of a user of the head mounted display;
determining a region of field of view of the first virtual space based on the reference sight line;
determining whether the display object is included in the region of field of view; and
determining that the predetermined condition is satisfied when the display object is included in the region of field of view.

10. The method according to claim 1,
wherein defining the first pair of virtual cameras comprises arranging the first right-eye virtual camera and the first left-eye virtual camera in a same virtual space as the second right eye-virtual camera, the second left-eye virtual camera, the display object and the three-dimensional object.

11. The method according to claim 1, further comprising changing inclinations of the first right-eye virtual camera, the first left-eye virtual camera, the second right-eye virtual camera and the second left-eye virtual camera based on an inclination of the head mounted display.

12. The method according to claim 1, wherein generating the second right-eye image and the second left-eye image having the three-dimensional object comprising a three-dimensional content including at least one of a three-dimensional text, a three-dimensional image, or a three-dimensional moving image.

13. A system comprising:
a non-transitory computer readable medium configured to store instructions; and
a processor connected to the non-transitory computer readable medium, wherein the processor is configured to execute the instructions to cause the system to:
define a virtual space including a display object and a three-dimensional object;
define a first pair of virtual cameras in the virtual space including a first right-eye virtual camera and a first left-eye virtual camera;
define a second pair of virtual cameras in the virtual space including a second right-eye virtual camera and a second left-eye virtual camera;
generate a first right-eye image based on the first right-eye virtual camera, and a first left-eye image based on the first left-eye virtual camera, wherein both the first right-eye image and the first left-eye image include a first part of the virtual space and the display object;
generate a second right-eye image based on the second right-eye virtual camera, and a second left-eye image based on the second left-eye virtual camera, wherein both the second right-eye image and the second left-eye image include a second part of the virtual space and the three-dimensional object;
superimpose the first right-eye image and the second right-eye image to overlap the three-dimensional object with the display object to form a superimposed right-eye image;
output the superimposed right-eye image to a right-eye display unit of a head mounted display;
superimpose the first left-eye image and the second left-eye image to overlap the three-dimensional object with the display object to form a superimposed left-eye image; and
output the superimposed left-eye image to a left-eye display unit of a head mounted display.

14. The system according to claim 13, wherein the processor is further configured to change inclinations of the first right-eye virtual camera, the first left-eye virtual camera, the second right-eye virtual camera and the second left-eye virtual camera in the virtual space based on an inclination of the head mounted display.

15. The system according to claim 13, wherein the processor is configured to generate the second right-eye image and the second left-eye image having the three-dimensional object comprising a three-dimensional content including at least one of a three-dimensional text, a three-dimensional image, or a three-dimensional moving image.

16. The system according to claim 13, the processor is configured to define the second pair of virtual cameras by defining a parallax between the second right-eye virtual camera and the second left-eye virtual camera with respect to the three-dimensional object is defined to be larger than a parallax between the first right-eye virtual camera and the first left-eye virtual camera with respect to the display object.

17. The system according to claim 13,
wherein the processor is configured to:
define the first pair of virtual cameras by arranging the first right-eye virtual camera and the first left-eye virtual camera in a first virtual space including the display object, and to generate both the first right-eye image and the first left-eye image by generating images of a part of the first virtual space and the display object, and
define the second pair of virtual cameras by arranging the second right-eye virtual camera and the second left-eye virtual camera in a second virtual space that is different from the first virtual space, the second virtual space includes the three-dimensional object, and to generate both the second right-eye image and the second left-eye image by generating images of a part of the second virtual space and the three-dimensional object.

18. The method according to claim 17, wherein the processor is further configured to determine whether a predetermined condition is satisfied in the first virtual space, and
in response to a determination that the predetermined condition is satisfied:
generate the second virtual space; and
arrange, in the second virtual space, the second right-eye virtual camera, the second left-eye virtual camera and the three-dimensional object that is stored in the non-transitory computer readable medium in association with the display object.

19. The system according to claim 18, wherein the processor is configured perform the determining by:
specifying a reference sight line of a user of the head mounted display;
determining a region of field of view of the first virtual space based on the reference sight line;
determining whether the display object is included in the region of field of view; and
determining that the predetermined condition is satisfied when the display object is included in the region of field of viewfield of viewfield of viewfield of view.

20. The system according to claim 13,
wherein the process is configured to define the first pair of virtual cameras by arranging the first right-eye virtual camera and the first left-eye virtual camera in a same virtual space as the second right eye-virtual camera, the second left-eye virtual camera, the display object and the three-dimensional object.

* * * * *